(12) United States Patent
Hald

(10) Patent No.: US 8,848,481 B2
(45) Date of Patent: Sep. 30, 2014

(54) RECONSTRUCTING AN ACOUSTIC FIELD

(75) Inventor: Jørgen Hald, Fredensborg (DK)

(73) Assignee: Bruel & Kjaer Sound & Vibration Measurement A/S, Naerum (DK)

( * ) Notice: Subject to any disclaimer, the term of this patent is extended or adjusted under 35 U.S.C. 154(b) by 863 days.

(21) Appl. No.: 13/002,943

(22) PCT Filed: Jun. 26, 2009

(86) PCT No.: PCT/EP2009/058039
§ 371 (c)(1),
(2), (4) Date: Mar. 22, 2011

(87) PCT Pub. No.: WO2010/003837
PCT Pub. Date: Jan. 14, 2010

(65) Prior Publication Data
US 2011/0164466 A1  Jul. 7, 2011

(30) Foreign Application Priority Data

Jul. 8, 2008  (DK) .................................. 2008 00957

(51) Int. Cl.
*G03B 42/06* (2006.01)
*G01H 3/12* (2006.01)
*G01S 15/89* (2006.01)

(52) U.S. Cl.
CPC ............ *G01H 3/125* (2013.01); *G01S 15/8915* (2013.01)
USPC .......................................................... 367/7

(58) Field of Classification Search
USPC .......................................................... 367/8
See application file for complete search history.

(56) References Cited

U.S. PATENT DOCUMENTS

| 4,809,249 | A * | 2/1989 | Barnes ......................... 367/100 |
| 2004/0131192 | A1* | 7/2004 | Metcalf ............................. 381/1 |
| 2005/0225497 | A1* | 10/2005 | Christensen et al. ......... 343/893 |
| 2006/0029242 | A1* | 2/2006 | Metcalf ........................ 381/300 |
| 2006/0098534 | A1* | 5/2006 | Hickling ...................... 367/124 |
| 2007/0068255 | A1* | 3/2007 | Hald ............... 73/587 |
| 2007/0223711 | A1* | 9/2007 | Bai et al. ........................ 381/56 |
| 2011/0172936 | A1* | 7/2011 | Hald et al. ...................... 702/56 |

OTHER PUBLICATIONS

Sean, F. Wu; On reconstruction of acoustic pressure fields using the Helmholtz equation least squares method; Department of Mechanical Engineering; Dated May 2000 (12 pages).
Jorgen Hald; Patch Holography in Cabin Environments Using a Two-Layer Handheld Array with an Extended Sonah Algorithm; Bruel & Kjaer SVM A/S; Dated May 30-Jun. 1, 2006; (8 pages).

(Continued)

*Primary Examiner* — Luke Ratcliffe
*Assistant Examiner* — James Hulka
(74) *Attorney, Agent, or Firm* — Nixon Peabody LLP

(57) ABSTRACT

Disclosed is a method of reconstructing a sound field. The method comprises receiving measured values of a first acoustic quantity measured at a set of measurement locations; computing a second acoustic quantity for a target location from a superposition of plane waves. The method comprises storing a set of representations of interpolations of respective functions, each function being a function of two or less input parameters; and computing comprises computing each of a set of correlation functions, each correlation function being indicative of a correlation of the plane waves at a first one of said measurement locations with the plane waves at a second location, as a linear combination of values obtained from the set of representations of interpolations.

30 Claims, 8 Drawing Sheets

(56) References Cited

OTHER PUBLICATIONS

Jorgen Hald; Patch Near-Field Acoustical Holography Using a New Statistically Optimal Method; Innovations, R&D, Bruel & Kjaer Sound & Vibration Measurement A/S; Dated Aug. 25-28, 2003 (8 pages).

Thorkild B. Hansen; Spherical Expansions of Time-Domain Acoustic Fields: Application to Near-Field Scanning; Rome Laboratory ERCT, Hanscom AFB; Dated Aug. 1995 (12 pages).

Jorgen Hald; Reduction of Spatial Windowing Effects in Acoustical Holography; Bruel & Kjaer A/S; Dated 1994; (4 pages).

Finn Jaconsen and Virginie Jaud; Statistically Optimized Near Field Acoustic Holography Using an Array of Pressure-Velocity Probes; Dated Mar. 2007; (9 pages).

Rolf Steiner and Jorgen Hald; Near-Field Acoustical Holography Without the Errors and Limitations Caused by the Use of Spatial DFT; McKinsey and Bruel & Kjaer Sound & Vibration Measurement A/S; Dated Jun. 2001; (11 pages).

Nicolas Valdivia and Earl G. Williams; Implicit Methods of Solution to Integral Formulations in Boundary Element Method Based Nearfield Acoustic Holography; Naval Research Laboratory; Dated Sep. 2004; (14 pages).

Zhaoxi Wang and Sean F. Wu; Helmholtz Equation-Least-Squares Method for Reconstructing the Acoustic Pressure Field; Department of Mechanical Engineering, Wayne State University; Dated Oct. 1997; (13 pages).

Earl G. Williams, J. D. Maynard and Eugen Skudrzyk; Sound Source Reconstructions Using a Microphone Array; Department of Physics and The Applied Research Laboratory; Dated Jul. 1980; (5 pages).

\* cited by examiner

RECONSTRUCTING AN ACOUSTIC FIELD

CROSS-REFERENCE TO RELATED APPLICATIONS

This application is a U.S. National Stage of International Application No. PCT/EP2009/058039, filed Jun. 26, 2009, which claims the benefit of Danish Patent Application No. PA 2008 00957, filed on Jul. 8, 2008, both of which are incorporated herein by reference in their entireties.

TECHNICAL FIELD

The present invention relates to the reconstruction of an acoustic field.

BACKGROUND

Near-field Acoustical Holography (NAH) is a very useful tool for 3D visualization of sound radiation and for precise noise source localization based on measurements over a surface near the sound source. Its ability to reconstruct also the evanescent wave components ensures a very high spatial resolution.

A known Near-field Acoustical Holography method is based on regular-grid measurements across a level surface in a separable coordinate system, allowing the NAH calculation to be performed by spatial Discrete Fourier Transform (DFT), see e.g. E. G. Williams, J. D. Maynard, and E. J. Skudrzyk, "Sound source reconstruction using a microphone array," J. Acoust. Soc. Am. 68, 340-344 (1980). Due to the use of DFT, the processing is very fast, but a side effect of using the DFT includes severe spatial windowing effects unless the measurement area fully covers the areas with high sound pressure. In some cases this requirement on the measurement area cannot be fulfilled, and in many cases the necessary size becomes prohibitively large.

A set of techniques have been proposed to reduce the spatial windowing effects, while still maintaining the DFT spatial processing but at the cost of an increased complexity and computational demands, see e.g. J. Hald, "Reduction of spatial windowing effects in acoustical holography," Proceedings of Inter-Noise 1994. Typically an iterative procedure is first used to extrapolate the measured sound pressure outside the measured area, followed by application of a DFT based holography method on the extended data window.

Other methods have been proposed that seek to avoid the use of spatial DFT and to provide a reduction in the required measurement area.

One such method is the Helmholtz' Equation Least Squares (HELS) method which uses a local model of the sound field in terms of spherical wave functions, see e.g. U.S. Pat. No. 6,615,143, Z. Wang and S. F. Wu, "Helmholtz equation-least-squares method for reconstructing the acoustic pressure field," J. Acoust. Soc. Am, 102(4), 2020-2032 (1997); or S. F. Wu, "On reconstruction of acoustic fields using the Helmholtz equation-least-squares method," J. Acoust. Soc. Am, 107, 2511-2522 (2000). However, since only spherical wave functions with a common origin are used to represent the sound field, errors will be introduced in the sound field reconstruction on the source surface, unless the source surface is also spherical and centred in the same origin. Another drawback of this prior art method is the requirement of the estimation problem not to be under-determined, meaning that the number of measurement positions must be larger than or equal to the number of spherical wave functions used in the field representation. This can require a large number of measurement positions to obtain a sufficiently accurate model. A third drawback is that scaling of the wave functions is not applied in such a way that functions with stronger decay in the model region are scaled to lower amplitudes in the same region. Because of this lack of scaling, traditional regularization methods like Tikhonov regularization do not work properly. Instead, the above prior art method applies a computationally expensive iterative search for an optimal truncation of the spherical wave expansion combined with a least squares solution without regularization.

Another previously proposed methodology is the Statistically Optimized Near-field Acoustic Holography (SONAH) method suggested in R. Steiner and J. Hald, "Near-field Acoustical Holography without the errors and limitations caused by the use of spatial DFT," Intern. J. Acoust. Vib. 6, 83-89 (2001). This prior art method is based on plane wave functions and the acoustic quantities on a mapping surface near the measurement surface are calculated by using a transfer matrix defined in such a way that all propagating waves and a weighted set of evanescent waves are projected with optimal average accuracy. The transfer matrix is obtained from 1) an Auto-correlation matrix of Auto- and Cross-correlations between all pairs of measurement positions and 2) a Cross-correlation matrix of Cross-correlations from each measurement point to every reconstruction position. The Auto- and Cross-correlations are in a domain of plane propagating and evanescent waves.

An application of this framework to specific planar measurement geometries has been described in J. Hald, "Patch near-field acoustical holography using a new statistically optimal method", Proceedings of Inter-Noise 2003, and J. Hald, "Patch holography in cabin environments using a two-layer handheld array and an extended SONAH algorithm," Proceedings of Euronoise 2006.

These prior art documents disclose the computation of the pressure and the particle velocity component normal to the measurement plane. The method is, however, computationally expensive, because numerical evaluation of the formulae for the correlations disclosed in these prior art documents is computationally inefficient.

SUMMARY

Disclosed herein is a method of reconstructing a sound field, the sound field being generated by at least one sound source. Embodiments of the method comprise:
receiving a set of measured values of at least a first acoustic quantity measured at respective ones of a set of measurement locations;
computing each of a set of correlation functions, each correlation function being indicative of a correlation of at least one set of plane propagating and evanescent waves at a first one of said measurement locations with the at least one set of plane waves at a second location
computing a second acoustic quantity indicative of the reconstructed sound field at a target location from at least the computed correlation functions and the set of measured values;
wherein the method further comprises storing a representation of a set of interpolation functions for interpolating respective contributions to the correlation functions, each contribution being a function of two or less input parameters; and wherein computing each of the set of correlation functions comprises computing each correlation function as a linear combination of values obtained from the stored representation.

The inventor has realised that the method described herein may be applied to general geometries and to the calculation of a number of different acoustical quantities in a uniform and computationally efficient way. It has further turned out that the correlation functions for a large variety of measurement geometries and acoustic quantities may be represented as linear combinations of 1- and/or 2-dimensional functions which may at least locally be approximated by respective interpolation functions of two or less input values. In particular, as the interpolation functions are no more than two-dimensional, a computationally efficient and yet accurate interpolation is achieved and the stored interpolation functions only require little storage capacity. Hence, the formulae on which the numeric computation is based have a form that is well suited for efficient computation through the use of approximation functions or tables combined with interpolation. Embodiments of the method described herein may perform about a factor of 10 faster than prior art methods The sound source may be any object emitting or reflecting acoustic radiation. The object may be arbitrarily shaped, and the sound may be any kind of sound, e.g. noise, audible sound, inaudible sound such as ultra-sound or infra-sound, etc., or a combination thereof. A region comprising the one or more sound sources may be defined by a source surface separating the sound source(s) from a source-free region. Typically, the source surface may be the surface of a physical object comprising the sound source(s).

Embodiments of the process comprise defining one or more virtual source planes each representing a set of plane propagating and evanescent wave functions; and where the plane waves have respective wave numbers and are propagating and/or evanescent in a direction relative to the virtual source plane. Generally, for a virtual source plane a normal pointing away from the source and into the region containing measurement and reconstruction locations (this region will also be referred to as the measurement region) may be defined. The corresponding propagating plane waves may generally cover all directions of propagation from the normal direction and up to 90 degrees away from that direction. The evanescent waves decay exponentially in that normal direction, i.e. into the measurement region. The evanescent waves may form a continuous spectrum with different decay rates and different tangential propagation directions.

For example the virtual source plane may be defined relative to a part of the surface of the object that comprises the sound source, i.e. relative to the source surface. For example, a virtual source plane may be defined as a surface spaced apart by a short distance from the source surface, and located inside the object.

The acoustic quantity at a measurement location may be measured by any suitable acoustic measuring device, e.g. a microphone, a hydrophone, a pressure gradient transducer, a particle velocity transducer, etc. or a combination thereof. In some embodiments, the measurement is performed by an array of acoustic measurement devices, e.g. a set of such devices arranged in a regular or irregular grid, for example, a two- or three-dimensional grid. The measured first acoustic quantity may be a sound pressure, a sound pressure gradient, a particle velocity, and/or the like.

The reconstructed sound field may be represented by any suitable data set indicative of a spatial distribution of a second acoustic quantity such as a sound pressure, a sound intensity or a particle velocity. The first and second acoustic quantities may be the same quantity or different quantities. The data set may be represented as a map, e.g. a map of the second acoustic quantity directly on the actual surface geometry of an arbitrary surface, e.g. a surface of a sound/noise emitting object to be analysed or a surface close to the object.

Since particle velocity on top of a hard surface corresponds closely to the actual vibration of the surface itself, the results can directly be used for correlation with structural models. In some embodiments the sound field is represented by a conformal map. The sound field parameters may be reconstructed and mapped on a surface, typically on or near the source surface. Alternatively or additionally, other representations of properties of the reconstructed sound field may be generated, e.g. spectra at single positions in the 3D region of validity of the wave function representation.

In embodiments of the method described herein, reconstruction of pressure or particle velocity at a calculation point involves computation of 1) an Auto-correlation matrix of Auto- and Cross-correlations between all pairs of measurement positions and 2) a Cross-correlation vector of Cross correlations from each measurement point to the target location. The Auto-correlation matrix can be re-used for all target locations. Auto- and Cross-correlations are defined in the domain of the plane propagating and evanescent wave functions used in the field representation Accordingly, the second location may be chosen from the target location and the measurement locations. In particular, the computation may include a computation of an auto- and cross-correlation matrix of correlation functions of the set of planar waves between respective measurement points and a cross correlation vector of correlation functions of the set of planar waves between respective measurement points and the target point.

The term interpolation function for interpolating respective contributions is intended to refer to any function or set of functions that locally approximates the contributions. When the representations of interpolation functions comprises a set of look-up tables, each look-up table including pre-calculated local approximations of a respective function, a particularly efficient computation is provided. Each look-up-table may be indicative of a two-dimensional array of function values indexed by two input parameters, and each function value may be indicative of a value of the two-dimensional function at an input point defined by the two input values. Each of the srespective functions may be a two-dimensional integral function including an integral parameterised by two input parameters.

Function values at other points may thus be efficiently obtained by interpolation, e.g. cubic interpolation, between the tabulated function values. As the look-up tables are low-dimensional, i.e. having a dimension of two or less, the interpolation process is accurate and computationally efficient, and the look-up tables only require little storage and can be generated with few computational resources.

A first one of the two input parameters may be indicative of a projected distance between the first measurement location and the second location in a plane parallel to the virtual source plane scaled by a factor indicative of a wave number. A second one of the two input parameters may be indicative of a linear combination (generally a sum or a difference) of respective distances from the virtual source plane to the first measurement location and to the second location, scaled by a factor indicative of a wave number. In some embodiments, this parameterisation allows the correlation functions to be expressed by a set of precalculated two-dimensional functions. The second input parameter may be indicative of the projected distance between the first measurement location and the second location projected onto the normal to the virtual source plane (usually the z-axis) and scaled by a factor indicative of a wave number.

In some embodiments, each plane wave function is scaled/weighted by a respective weighting factor according to a predetermined weighting scheme. For example, the predetermined weighting scheme may be chosen from a uniform weighting and a directional weighting. In the uniform weighting scheme, each planar wave is scaled by the same constant factor. In the directional weighting of a plane wave, each plane wave is scaled by a respective weighting factor which depends on a direction of propagation of the plane wave, e.g. by providing a higher weighting factor to plane waves having a direction of propagation with a larger component parallel to the source plane. Such waves will also be referred to as off-axis waves as they are non-parallel to the surface normal of the virtual source plane. The directional weighting has been found to improve the accuracy of the reconstruction method.

According to some embodiments, it has been found that for a given weighting scheme, both the sound pressure and the particle velocity may be computed for a variety of measurement and reconstruction geometries based on a single set of tabular representations of six two-dimensional functions. Only the function parameters, at which interpolated function values must be calculated, will change with geometry.

In some embodiments, the virtual source plane is chosen to define a first spatial domain, also referred to as the measurement domain, including the measurement locations and the target location, and a second spatial domain, also referred to as the source domain—different from (opposite to) the first spatial domain, the second spatial domain including typically most of the sound source, i.e. the target location and the measurement location are located in the measurement domain, and the sound field is reconstructed in the measurement domain. Even though the virtual source plane is typically defined a short distance inside the source plane, for the purpose of the reconstruction process the measurement domain defined by the virtual source plane is assumed to be source-free.

In some situations it may not be possible or practical to define a source-free spatial domain by a single virtual source plan. Consequently, in some embodiments, the method is based on two or more sets of plane waves each propagating and evanescent in a direction relative to respective virtual source planes. For example, the virtual source planes may be defined as one or more pairs of spaced-apart, parallel virtual source planes, where the source-free region is located between each of the respective pairs of virtual source planes. It has been realised by the inventor that the present method and the same set of tabulated interpolation functions may be applied to this situation as well, thereby providing an efficient as well as flexible reconstruction method.

The set of measurement locations may be arranged in one or more measurement planes, e.g. in a single plane or in two or more parallel planes. Within each plane, the measurement locations may be arranged on a regular grid, in an irregular pattern, or in any other suitable way. Furthermore, the method described herein may also be applied to non-planar measurement geometries, i.e. arrangements where the measurement locations are not located in one or more parallel planes, but e.g. on a curved surface.

In some embodiments, a further increase of efficiency may be obtained when the measurement and calculation points are arranged in respective planes parallel with all virtual source planes. In such a setup, only a few values of one of the input parameters of the contributions to the correlation functions occur for each frequency of the plane waves, thus making the generation of 1D look-up tables attractive, where each table corresponds to a respective value of said input parameter. Hence, for certain geometries, the method may even be based on one-dimensional interpolation functions, and thus be performed particularly computationally efficiently.

When the second acoustic quantity is a particle velocity having a component in a direction parallel to the virtual source plane, an improved analysis of objects with curved source surfaces is facilitated. In particular, this embodiment allows an improved reconstruction of the sound field in target locations distributed across a curved reconstruction surface (e.g. conformal with the source surface). Since this embodiment of the reconstruction process provides the components of particle velocity parallel with the virtual source plane, the components of the particle velocity normal to the reconstruction surface (and/or the intensity) can be determined across the curved reconstruction surface.

Embodiments of the method disclosed herein may be regarded as performing a linear prediction of a sound field parameter at a target point based on a set of measured quantities, the prediction coefficients being determined so as to provide in a least squares sense the best estimate for all plane propagating waves and a weighted set of the evanescent waves. A least-squares fit may be regarded as a numerical process of determining a set of complex coefficients that solve in an approximate way an over-determined set of linear equations.

It is then desirable to know, how well on average the values of these plane wave functions are predicted at the calculation point. Accordingly, in some embodiments a reconstruction method comprises computing a quantity indicative of an estimated error of the calculated acoustic quantity. The error indicator can be computed using the previously described Auto- and Cross-correlations, i.e. with little additional computational resources. The above method for estimating the prediction accuracy of a SONAH process has proven to be very useful to visualize and determine the regions of validity of the SONAH predictions with given measurement geometries.

It is noted that features of the method described above and in the following may be implemented at least in part in software or firmware and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Embodiments of the present invention can be implemented in different ways, including the method described above and in the following, systems, devices and product means, each yielding one or more of the benefits and advantages described in connection with the first-mentioned method, and each having one or more embodiments corresponding to the embodiments described in connection with the first-mentioned method and/or as disclosed in the dependent claims.

In particular, embodiments of a processing apparatus for reconstructing a sound field comprise an interface for receiving a set of measured values of at least a first acoustic quantity measured at respective ones of a set of measurement locations; and a processing unit configured to compute each of a set of correlation functions, each correlation function being indicative of a correlation of at least one set of plane waves at a first one of said measurement locations with the at least one set of plane waves at a second location; and to compute a second acoustic quantity indicative of the reconstructed sound field at a target location from at least the computed correlation functions and the set of measured values;

wherein the processing unit comprises a storage medium for storing a representation of a set of interpolation functions for interpolating respective contributions to the correlation functions, each contribution being a function of two or less input parameters; and wherein the processing unit is adapted to compute each of the set of correlation functions as a linear combination of values obtained from the stored representation.

It will be appreciated that the stored representation may be generated at software compilation time of a computer program for performing the reconstruction process (e.g. as part of the computer program or in a separate file or files), or it can be generated by the resulting program code at run-time, or as a combination thereof. For example, the representation may be generated by the computer program or an installation program and stored on a computer during a first execution/installation of the computer program.

A system for reconstructing a sound field may comprise an apparatus as disclosed above and in the following and a set of transducers for measuring the first acoustic quantity at a set of measurement locations, and connectable in communication connection to the apparatus so as to forward the measured values to the apparatus.

A computer program may comprise program code means adapted to cause a data processing system to perform the steps of the method disclosed above and in the following when the program code means are executed on the data processing system. The computer program may be stored on a storage means or embodied as a data signal. The storage means may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

Throughout the drawings, equal reference signs refer to equal or corresponding elements, features, or components, wherever feasible.

DETAILED DESCRIPTION

Figure 1:
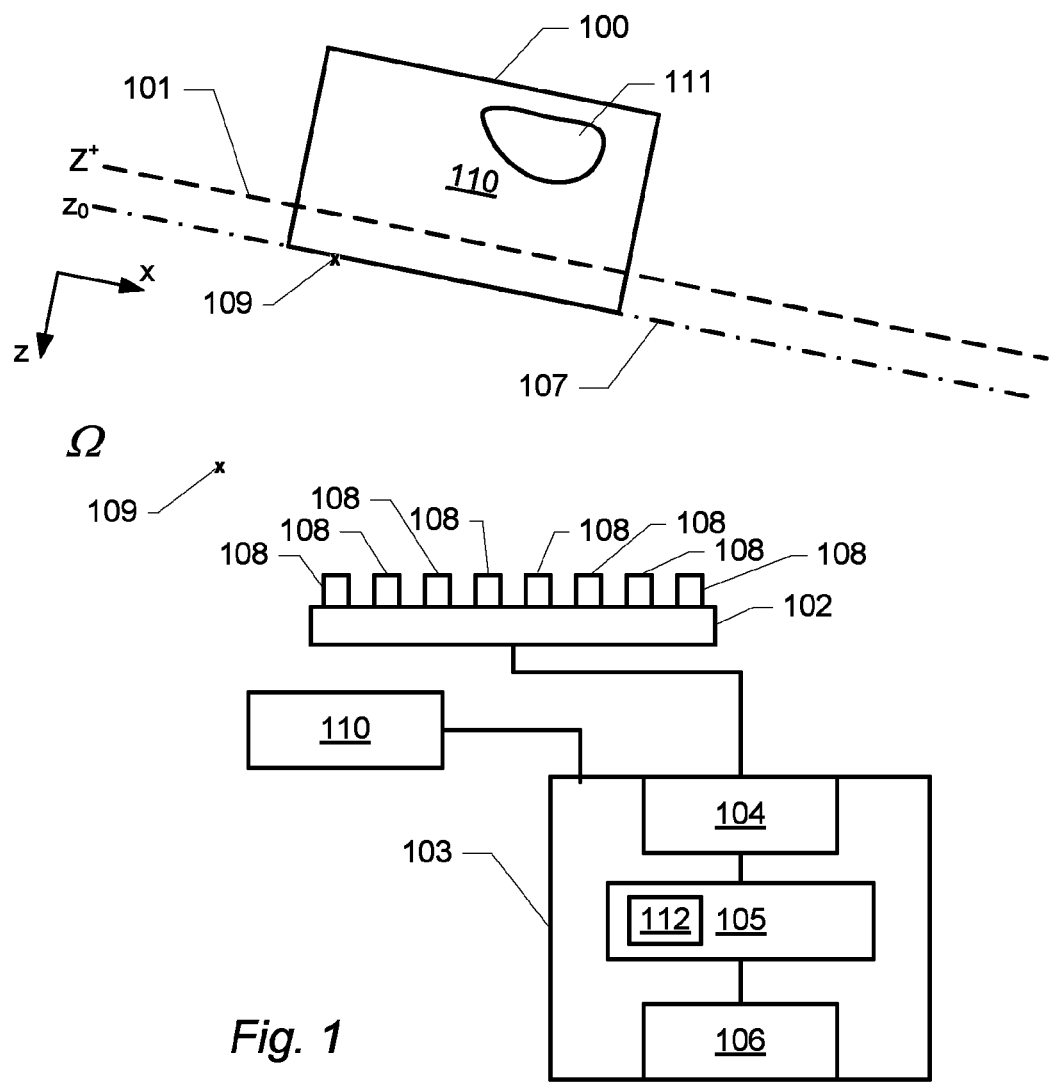
FIG. 1 shows a schematic block diagram of a system for reconstructing a sound field.

FIG. 1 shows a schematic block diagram of a system for reconstructing a sound field. The system comprises a set of acoustic receivers 108 and an analysing unit 103 connected to the acoustic receivers.

In the following the acoustic receivers 108 will also be referred to as transducers. Nevertheless, it will be appreciated that the acoustic receivers may be microphones, hydrophones or any other suitable device for measuring an acoustic property such as sound pressure, sound pressure gradient, particle velocity, or other linear quantities. In the embodiment of FIG. 1, the transducers 108 are implemented as an array 102 of transducers where the transducers 108 are arranged in a regular grid, e.g. a 1-, 2-, or 3-dimensional grid. While an arrangement in a regular grid allows for an efficient numerical implementation, other geometries may be used. In some embodiments, even a single transducer may be used to take measurements at different points in series. Such a serial measurement may e.g. be used in situations where the sound source is stationary, and where the phase can be measured relative to one or several reference signals. The number of transducers and the geometry of the array, e.g. the inter-transducer spacing, may be chosen in accordance with the size and geometric complexity of the object to be analysed, the frequency range of interest, and the desired spatial resolution.

The transducer array 102 is connected to the analysing unit 103 such that the transducers 108 can forward the measured signals to the analysing unit, e.g via a wired or wireless signal connection.

The analysing unit 103 includes interface circuitry 104 for receiving and processing the measured signals from the transducer array 102, a processing unit 105 in data communication with the interface circuit 104, a storage medium 112, and an output unit 106 in data communication with the processing unit 105. Even though shown as a single unit in FIG. 1, it will be appreciated that the analysing unit 103 can be physically divided in two separate devices, e.g. an acquisition front-end and a computer, or even more than two devices. Similarly, it will be appreciated that the functions described in relation to the different sub-blocks of the analysing unit may be divided into alternative or additional functional or hardware units/modules.

The interface circuit comprises signal processing circuitry suitable for receiving the output signals from the transducers 108 and for processing the received signals for subsequent analysis by the processing unit 105. The interface circuit 104 may comprise one or more of the following components: one or more pre-amplifiers for amplifying the received signals, one or more analogue-to-digital (A/D) converters for converting the received signal into a digital signal, one or more filters, e.g. bandwidth filters, and/or the like. For example, the interface circuit may provide as output data the amplitude and phase as a function of frequency for each of the transducers. In some embodiments, the interface unit may perform a simultaneous time data acquisition, and all further processing may then be done by the processing unit 105, including transform of data to frequency domain, typically using FFT.

The processing unit 105 may be a suitably programmed microprocessor, a central processing unit of a computer, or any other suitable device for processing the signals received from the interface unit 104, e.g. an ASIC, a DSP, and/or the like. The processing unit is adapted to process the transducer signals received via the interface circuit 104 so as to compute a reconstructed sound field as described herein.

The storage medium 112 may comprise any suitable circuitry or device for storing data indicative of a representation of a set of interpolation functions, such as a RAM, a ROM, an EPROM, EEPROM, flash memory, magnetic or optical storage device, such as a CD ROM, a DVD, a hard disk, and/or the like. In FIG. 1, the storage medium is shown separate but in communication connection with the processing unit. It will be appreciated, however, that the storage medium 112 may also be embodied as a part of the processing unit 105, e.g. as an internal memory.

The output unit 106 may comprise a display or any other suitable device or circuitry for providing a visual representation of the reconstructed sound field, e.g. a printer and/or printer interface for providing a printed representation. Alternatively or additionally, the output unit 106 may comprise any suitable circuitry or device for communicating and/or storing data indicative of the reconstructed sound field, such as a RAM, a ROM, an EPROM, EEPROM, flash memory, magnetic or optical storage device, such as a CD ROM, a DVD, a hard disk, a wired or wireless data communications interface, e.g. an interface to a computer or telecommunications network, such as a LAN, a wide area network, and internet, and/or the like.

The analysing unit 103 may be implemented as a suitably programmed computer, e.g. a PC including a suitable signal acquisition board or circuit.

The system may further comprise a suitable position detection device 110 connected to the analysing unit 103, for detecting the position of the transducers 108, e.g. relative to a reference coordinate system. The position detecting device may include a test bench, frame, or other structure, to which the transducer array can be mounted at predetermined positions and orientations, and/or where the position and orientation of the array may be measured manually or automatically, e.g. by suitable sensors. Alternatively, the transducer array 102 may include a position detecting device, or at least a part thereof. For example, the transducer array may include a coil of a magnetic field position detection system, a gyroscope, an optical position detection system and/or the like.

During operation, the transducer array 102 is positioned near a surface of an object 100 including a sound source 111 that emits acoustic radiation and for which a sound field is to be reconstructed. The number of transducers, the geometry of the array, e.g. the inter-transducer spacing, and the distance between the array and the source surface may be chosen in accordance with the size and geometric complexity of the object to be analysed, the frequency range of interest, and the desired spatial resolution. For example, for the reconstruction of sound fields of a car engine an 8×8 matrix array of microphones with 3 cm inter-element spacing may be used. It will be appreciated, however, that other types and sizes of arrays may be used as well.

The position of the array 102 is determined, e.g. by position detection device 110, and fed into the analysing unit 103. The transducers 108 of the array 102 measure sound pressure or another suitable acoustic quantity at the determined position, and the resulting transducer signals are sent to the analysing unit 103.

For example, the transducer array may be a hand-held array with integrated position detection device, thus allowing measurements at different accessible positions distributed around the object and reducing the time spent on special preparation of the source to the test is minimal. For example, when mapping a sound source, e.g. a compressor, a pump, or other machine, on a test bench, the time required for changing the test set-up, e.g. routing of fuel lines, electronic wiring etc., to provide unhindered access to a complete face is reduced if not eliminated. Another typical application may be inside a car cabin, where a 3D array grid may be used to be able to distinguish sources in all directions, e.g. a dual layer array (e.g. including 8×8×2 sensors) may be used.

The analysing unit 103 computes a reconstructed sound field from the input data, and stores and/or outputs a representation of the reconstructed sound field.

An embodiment of a process for generating a reconstructed sound field will be described with reference to FIG. 2 and continued reference to FIG. 1.

In order to illustrate the reconstruction process described herein, an initial summary of the so-called SONAH method will now be provided.

For the purpose of the present description, we assume that the complex time-harmonic sound pressure $p(r_i)$ has been measured at a set of positions $r_i$, i=1, 2, ..., I in a source free region $\Omega$ occupied by a homogeneous fluid. We consider the problem of reconstructing the sound field in $\Omega$ based on the measured pressures. To do that we initially introduce a discrete set of elementary wave functions, $\Psi_n$, n=1, ..., N, fulfilling the homogeneous wave equation and being capable of representing with a sufficiently high accuracy all sound pressure fields that can exist in $\Omega$. Generally, these elementary wave functions can be plane, cylindrical or spherical waves, or they can be sound fields from elementary sources such as monopole or dipole point sources distributed outside $\Omega$.

In the so-called HELS method, the first step in the reconstruction is to determine the amplitude and phase of each elementary wave function in the representation of the sound field. This is done by requiring that the elementary wave model represents as accurately as possible the measured pressures:

$$p(r_i) = \sum_{n=1}^{N} a_n \Psi_n(r_i), \ i = 1, \ldots, I \quad (1)$$

The $a_n$ being the complex expansion coefficients. If $I \geq N$, and if the measurement points have been suitably chosen, then the expansion coefficients can be found by least squares solution of (1). Otherwise the problem is under-determined, and among the infinity of solutions to (1) the one with the smallest 2-norm may be adopted. This solution will be referred to as a Helmholtz' Equation Least Norm (HELN) solution.

To obtain a matrix formulation we define the matrix B of wave function values at the measurement positions:

$$B \equiv \{\Psi_n(r_i)\} \equiv \begin{pmatrix} \Psi_1(r_1) & \Psi_2(r_1) & \ldots & \Psi_N(r_1) \\ \Psi_1(r_2) & \Psi_2(r_2) & & \Psi_N(r_2) \\ \vdots & & \ddots & \vdots \\ \Psi_1(r_I) & \Psi_2(r_I) & \ldots & \Psi_N(r_I) \end{pmatrix} \quad (2)$$

and the vectors p and a with measured pressures and with expansion coefficients, respectively:

$$p \equiv \{p(r_i)\} \equiv \begin{pmatrix} p(r_1) \\ p(r_2) \\ \vdots \\ p(r_I) \end{pmatrix}, a \equiv \{a_n\} \equiv \begin{pmatrix} a_1 \\ a_2 \\ \vdots \\ a_N \end{pmatrix}. \quad (3)$$

Using these definitions, Eq. (1) can be rewritten in the following form:

$$Ba = p \quad (4)$$

With $I \geq N$ the least squares (HELS) solution is $$a = (B^H B)^{-1} B^H p,$$

and with $I < N$ the least norm (HELN) solution is $$a = B^H (BB^H)^{-1} p,$$

the symbol H representing Hermitian transpose. In practice, regularization has to be applied in these solutions. Although other regularization schemes may be used, for the purpose of the present description, we will consider only Tikhonov regularization, and in that case the HELS and HELN formulae become $$a = (B^H B + \epsilon I)^{-1} B^H p \quad (5)$$

and $$a = B^H (BB^H + \epsilon I)^{-1} p, \quad (6)$$

respectively, $\epsilon$ being a positive regularization parameter and I a unit diagonal quadratic matrix of appropriate dimensions. It is noted that actually the two regularized formulae (5) and (6) provide exactly the same solution independent of the values of I and N. However, for $I < N$ it is still a computational advantage to use the HELN formula (6) because the matrix $BB^H$ has smaller dimension than $B^H B$.

With the expansion coefficients known, the sound pressure at an arbitrary point r in Ω can be calculated by summation of the wave function contributions:

$$p(r) = \sum_{n=1}^{N} a_n \Psi_n(r) = a^T \alpha(r), \alpha(r) \equiv \begin{pmatrix} \Psi_1(r) \\ \Psi_2(r) \\ \vdots \\ \Psi_N(r) \end{pmatrix}, \quad (7)$$

T representing the transpose of a matrix or vector. The particle velocity in a direction $\chi$ can then be estimated from the sound field representation (7) by application of Euler's equation:

$$u_\chi(r) = \frac{-1}{j\omega\rho_0} \frac{\partial p(r)}{\partial \chi} \quad (8)$$

Here, $\omega$ is the angular frequency, $\rho_0$ is the density of the medium, and the implicit time variation is $e^{j\omega t}$. Other symbols to be used subsequently are the propagation speed of sound c in the medium and the wave-number $k \equiv \omega/c$.

Plane waves constitute continuous spectra in a wave-number domain, so use of these in the above formulation must involve a sub-set of the wave functions obtained by sampling in the wave-number domain. Embodiments of the method described herein overcome this sampling problem by solving the field estimation problem in a dual way utilising the SONAH methodology, e.g. as described in J. Hald, "Patch near-field acoustical holography using a new statistically optimal method", Proceedings of Inter-Noise 2003, and J. Hald, "Patch holography in cabin environments using a two-layer handheld array and an extended SONAH algorithm," Proceedings of Euronoise 2006.

According to the SONAH method the unknown sound pressure p(r) at a point r in Ω is obtained as a linear combination of the known sound pressure values:

$$p(r) = p^T c(r) \quad (9)$$

where the vector c(r) contains the complex estimation weights. The vector c is then obtained by requiring that the prediction formula (9) provides in a least squares sense the best average prediction for all expansion functions $\Psi_n$. With reference to Eq. (2) and (7) this means that c(r) should be found as the least squares solution to the following set of linear equations:

$$B^T c(r) = \alpha(r) \quad (10)$$

This equation is under-determined whenever the HELS Eq. (4) is over-determined and vice versa. For the purpose of the present description, the Tikhonov regularized solution will be considered, meaning that the least squares and least norm solutions to (10) can be both expressed in terms of the least squares formula:

$$c(r) = (A^H A + \epsilon I)^{-1} A^H \alpha(r) \quad (11)$$

where the matrix A is the transpose of B:

$$A \equiv B^T. \quad (12)$$

From the definitions (7) and (12) it follows that the elements of $A^H A$ and $A^H \alpha(r)$ are given by formulae (13) and (14) below, respectively, "*" representing complex conjugation:

$$[A^H A]_{ij} = \sum_n \Psi_n^*(r_i) \Psi_n(r_j) \quad (13)$$

$$[A^H \alpha(r)]_i = \sum_n \Psi_n^*(r_i) \Psi_n(r) \quad (14)$$

The matrix $A^H A$ can be seen as a matrix of cross correlations between the measurement points in the domain of the elementary wave functions (expansion functions), and the vector $A^H \alpha(r)$ then contains the cross correlations between the measurement points and the estimation position r (see e.g. R. Steiner and J. Hald, "Near-field Acoustical Holography without the errors and limitations caused by the use of spatial DFT," Intern. J. Acoust. Vib. 6, 83-89 (2001)). It may further be noted that $A^H A$ is a Hermitian symmetric matrix with non-negative eigenvalues, and that its dimensions equal the number I of measurement points, independently of the number of expansion functions.

The above prediction formulation will is referred to as the SONAH prediction formulation, and it provides the same solution as the HELS/HELN formulae. Actually, the HELN Eqs. (7) and (6) lead to the SONAH formulae:

$$\begin{aligned} p(r) &= a^T \alpha(r) \\ &= p^T \left[ (BB^H + \varepsilon I)^{-1} \right]^T B^* \alpha(r) \\ &= p^T \left[ (BB^H + \varepsilon I)^T \right]^{-1} B^* \alpha(r) \\ &= p^T [A^H A + \varepsilon I]^{-1} A^H \alpha(r) \\ &= p^T c(r). \end{aligned} \quad (15)$$

Here we have used the fact that for any non-singular quadratic matrix the transpose of the inverse equals the inverse of the transpose.

Since SONAH does not explicitly calculate the expansion coefficients a, no weighting/filtering can be performed on a set of expansion coefficients. Such filtering is integrated in the calculation of the weight vector $c(r)$. A tool to do this is the regularization, but making it work properly requires a suitable scaling of the elementary wave functions that define the matrix $A^H A$. Typically, by choosing a larger value of the regularization parameter $\varepsilon$ we would like to suppress those evanescent elementary waves not already suppressed that require the largest amplification in their reconstruction on the source surface. In order for this to happen, these elementary waves must correspond to the smallest singular values of $A^H A$ that are still above the cut-off level of the Tikhonov regularization. Such behavior can be supported through scaling of the elementary wave functions by ensuring that wave functions requiring larger amplification in the reconstruction have smaller amplitude across the microphone positions.

Figure 3:
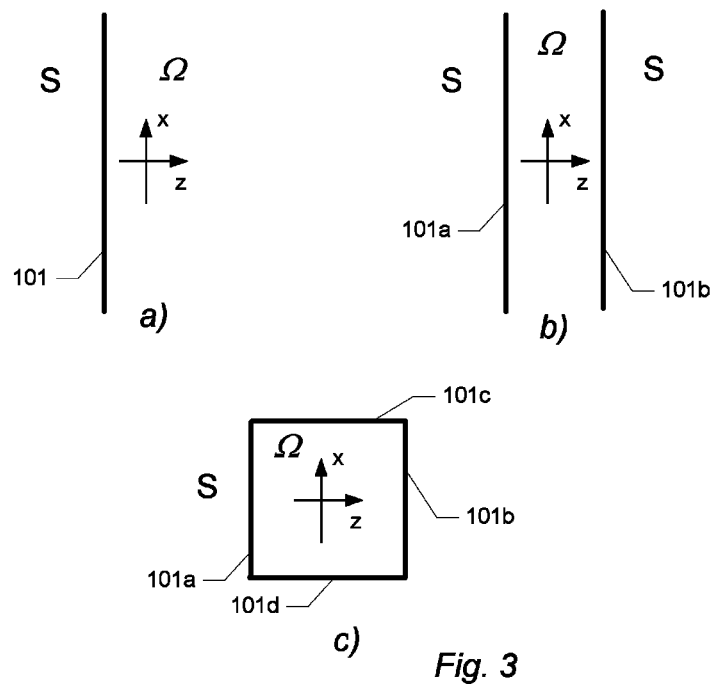
FIG. 3 illustrates measurement geometries in situations with only one virtual source plane, with two parallel virtual source planes limiting a homogeneous and source free region, and with virtual source planes on all six sides of a box-shaped homogeneous and source free region.

In the present embodiment the elementary waves are plane propagating and evanescent waves, and we consider first the case where the sound field is reconstructed in free-field conditions as illustrated in FIG. 3a, i.e. where one or more sources behind a source plane 107 at $z=z_0$, $z_0<0$, radiate into the source free, homogeneous half space $z \geq z_0$, designated $\Omega$. In this case, the radiated sound field can be represented by plane wave functions of the form $$\Phi_k(r) = F(k_z) e^{-j(k_x x + k_y y + k_z(z-z^+))} \quad (16)$$

where F is an amplitude scaling function, and $z=z^+$, $z^+ \geq z_0$, is the so-called virtual source plane 101 which defines the wave functions—for example the evanescent components decay in directions perpendicular to the virtual source plane. The virtual source plane is generally defined to lie a small distance inside the real source surface. The source plane 107 is the nearest plane parallel to the virtual source plane that is still in the source free region—it is thus a parallel plane just touching (i.e. being tangential to) the real source surface. In the free-field case with only a single virtual source plane, the xy-plane is generally parallel with the virtual source plane. In Eq. (16) $r \equiv (x,y,z)$ and $k \equiv (k_x, k_y, k_z)$, where $k_x$ and $k_y$ are real wave-numbers, and $k_z$ is a complex number defined as:

$$k_z \equiv \begin{cases} \sqrt{k^2 - (k_x^2 + k_y^2)} & (k_x^2 + k_y^2) \leq k^2 \\ -j\sqrt{(k_x^2 + k_y^2) - k^2} & (k_x^2 + k_y^2) > k^2 \end{cases} \quad (17)$$

Thus, the complete set of expansion functions constitutes a continuous spectrum in the two wave-number variables $k_x$ and $k_y$. The virtual source plane $z=z^+$ may coincide with the real source plane at $z=z_0$, but typically it will be behind that plane, i.e. $z^+ < z_0$. The superscript "+" on the coordinate of the virtual source plane indicates that waves propagating in the positive z-axis direction are represented.

Notice that in Eq. (16) the scaling function $F(k_z)$ defines the amplitude of all wave functions on the virtual source plane, $z=z^+$.

To use the discrete HELS or SONAH formulations described above, we initially select a discrete sub-set by regular sampling in the 2D wave-number domain $(k_x, k_y)$:

$$\Psi_n(r) \equiv \Phi_{k_n}(r). \quad (18)$$

When choosing the sampling spacing, one should be aware that a regular discrete representation in the wave-number domain will represent a field that is spatially periodic, leading to wrap-around errors just like in traditional NAH based on spatial DFT processing. The sampling spacing should therefore be smaller than $2\pi$ divided by the smallest acceptable period length. At the same time, the sampling area should cover all propagating waves and all those evanescent waves that have significant amplitude in the measurement region. This typically leads to a number N of expansion functions larger than the number I of measurement positions. The equivalent HELS problem will therefore be under-determined, and the solution (6) will be dominantly a least norm solution.

In some embodiments a unit weighting of the wave functions may be used where $F(k_z)=1$. Then, according to Eq. (16) all plane wave functions have an amplitude equal to one in the virtual source plane, $z=z^+$. The HELS expansion coefficient vector, a, is therefore simply the wave-number spectrum of the sound field representation in that plane, and the matrix B can be seen as a matrix of transfer functions from that plane wave spectrum to the sound pressure values at the microphone positions. The elements of B are given by Eq. (16) with the microphone coordinates inserted. It is interesting to note that, through the transfer matrix B, evanescent wave components ($\Phi_k$ with $|k|>k$) will get an attenuation that increases exponentially with wave-number. The overall trend therefore is that these wave-number components correspond to smaller and smaller singular values of the matrix B. This property ensures that filtering of the evanescent wave components can be performed by Tikhonov regularization in the inverse solution for the wave-number spectrum, a. Some combinations of propagating waves will also correspond to small singular values, for example combinations that represent sound radiation from areas in the virtual source plane far from the measurement positions. Such combinations will also be suppressed by the regularization.

Because of the above mentioned under-determined nature of the HELS problem, the solution will dominantly be a minimum norm solution. A further reduction of the norm of the solution vector, a, will be introduced by the regularization. The solution process will therefore minimize the energy in the wave-number spectrum and consequently also the energy in the pressure distribution in the virtual source plane and in parallel planes, under the constraint that the pressure at the microphones is well represented. Because of that, a good sound field representation is achieved within a volume around the measurement positions, while an increasing under-estimation will be seen away from the measurement positions. Since SONAH and HELS provide the same solution (15), the consequences will be the same for SONAH, as is also illustrated by the results described below.

Figure 4:
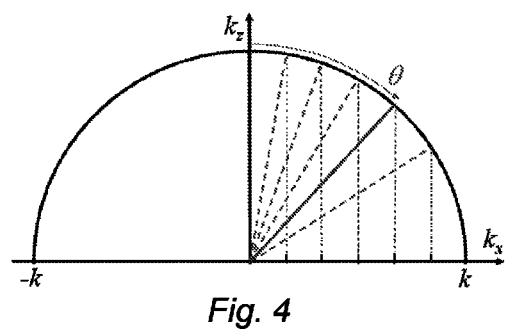
FIG. 4 illustrates the density of plane wave functions in $(k_x, k_y)$-domain and in propagation angle domain.

FIG. 4 illustrates the regular sampling of Eq. (18) along the $k_x$ wave-number axis at $k_y=0$. Inside the radiation circle, i.e. for $$k_x^2+k_y^2 \leq k^2,$$

a specific sample at $(k_x,k_y)$ corresponds to a plane wave propagating in the direction of the vector $(k_x,k_y,k_z)$ with $k_z$ given by Eq. (17). In FIG. 4, this direction can be found by projecting the sample position $k_x$ up on the shown half circle with radius k. With a constant density of the sample points in the $(k_x,k_y)$ plane, the angular density of the plane waves will be highest close to the z-direction, and decreasing when the off-axis angle θ increases towards 90°. Thus, when using a constant weighting function F, then plane waves propagating near the axial direction will get a higher weight than the far off-axis waves in the least squares solution (11) for the prediction weights of SONAH. This can be compensated by applying a higher weight F to the off-axis waves. Considering an infinitely small area segment on the $(k_x,k_y)$-plane, it will represent an area on the directional hemisphere $$k_x^2+k_y^2+k_z^2=k^2$$

which is larger by a factor $1/\cos(\theta)=k/|k_z|$. A constant directional power spectral density can therefore be obtained by choosing F such that $$|F(k_z)|^2 k/|k_z|$$

is constant, for example $$F(k_z) = F_0 \sqrt{\frac{k}{|k_z|}} \quad (19)$$

where $F_0$ is a constant. Equations (13), (14), (16) and (18) show that the contributions to the elements of the matrices $A^H A$ and $A^H \alpha(r)$ are obtained by summation over wave-number contributions which are scaled by $|F|^2$. This is a reason why choosing the equalization to be on the power density and not on the amplitude density may be advantageous. The "omni-directional weighting" of Eq. (19), applied also outside the radiation circle, has been found to provide on the average slightly better accuracy than the constant weighting $F(k_z)=1$. Therefore, in some embodiments, the omni-directional weighting is used, and it will also be used to illustrate the method throughout the present description.

To remove completely the wrap around problem caused by the discrete representation in the wave-number domain, we now let the sampling spacing in the $(k_x,k_y)$-plane go to zero, meaning that the summations in Eq. (13) and (14) become integrals over the $(k_x,k_y)$-plane. Equation (11) shows that a common scaling factor applied to the elements of $A^H A$ and $A^H \alpha(r)$ does not change the SONAH results, if the regularization factor is adjusted accordingly. We can therefore choose to scale the limiting integral expressions in the following way $$[A^H A]_{ij} \equiv \frac{1}{2\pi k^2} \int_{-\infty}^{\infty} \int_{-\infty}^{\infty} \Phi_k^*(r_i) \Phi_k(r_j) dk_x dk_y \quad (20)$$

$$[A^H \alpha(r)]_i \equiv \frac{1}{2\pi k^2} \int_{-\infty}^{\infty} \int_{-\infty}^{\infty} \Phi_k^*(r_i) \Phi_k(r) dk_x dk_y \quad (21)$$

The limiting values (20) and (21) of the matrix elements correspond to the matrix A and the vector α(r) having a dimension that is infinite. A and α(r) will anyway be used in a couple of subsequent derivation, where they should be understood as a limiting cases N→∞.

The two-dimensional integrals in Eq. (20) and (21) can be reduced to one-dimensional integrals through application of Eq. (16), (17) and (19): First, a transformation is performed to polar coordinates (K, ψ) in the wave-number domain, $(k_x,k_y)=(K \cos(\psi), K \sin(\psi))$, and then the integration in the polar angle ψ can be worked out analytically. As a result the integrals of Eq. (20) and (21) can be expressed in terms of the following two functions of two variables:

$$I_p(\rho, \zeta) \equiv \int_0^{\pi/2} J_0(\rho \sin(\theta)) e^{j\zeta \cos(\theta)} \sin(\theta) d\theta \quad (22)$$

$$II_p(\rho, \zeta) \equiv \int_0^{\infty} J_0(\rho\sqrt{1+v^2}) e^{-\zeta v} dv \quad (23)$$

where $J_0$ is the Bessel function of order zero. The function $I_p$ represents contributions from inside the radiation circle in the wave-number domain, with the substitution $K=k \sin(\theta)$ in the integral expression, and the function $II_p$ represents contributions from outside the radiation circle, with the substitution $$K=k\sqrt{1+v^2}$$

in the integral expression. These variable substitutions have been introduced to make the integrals in (22) and (23) better suited for Gaussian types of numerical integration. Using the functions $I_p$ and $II_p$, the formulae (20) and (21) for the matrix elements can be reformulated as follows:

$$[A^H A]_{ij} = F_0^2 I_p(kR_{ij}^{xy}, k(z_i-z_j)) + F_0^2 II_p(kR_{ij}^{xy}, k(z_i+z_j-2z^+)) \quad (24)$$

$$[A^H \alpha(r)]_i = F_0^2 I_p(kR_i^{xy}, k(z_i-z)) + F_0^2 II_p(kR_i^{xy}, k(z_i+z-2z^+)) \quad (25)$$

Here, $r_i \equiv (x_i,y_i,z_i)$ and $r_j \equiv (x_j,y_j,z_j)$ are two microphone positions, the pressure estimation position is $r \equiv (x,y,z)$, $R_{ij}^{xy}$ is the distance between the projections of microphone positions i and j on the xy-plane (the virtual source plane), and $R_i^{xy}$ is the distance between the projections of microphone position i and the pressure calculation position on the xy-plane. The pressure at the position r can now be estimated using Eq. (9) and (11). Different methods for determination of the regularization parameter ε of Eq. (11) have been investigated in J. Gomes and P. C. Hansen, "A study on regularization parameter choice in Near-field Acoustical Holography," Proceedings of Acoustics'08, 2008, and the L-curve method was found to provide the overall most stable result in connection with SONAH. Earlier studies with uncorrelated measurement errors had pointed at Generalized Cross Validation (GCV).

To obtain particle velocity estimates we apply Euler's Eq. (8) to the SONAH pressure estimate given by Eq. (9) and (11). As a result we obtain:

$$u_\chi(r) = \frac{1}{j\omega\rho_0}\frac{\partial p(r)}{\partial \chi} = \frac{1}{\rho_0 c}p^T(A^H A + \varepsilon I)^{-1}A^H \beta_\chi(r) \quad (26)$$

where:

$$A^H \beta_\chi(r) \equiv \frac{-1}{jk}\frac{\partial \{A^H \alpha(r)\}}{\partial \chi} \quad (27)$$

Explicit formulae for $A^H\beta_\chi(r)$ can be obtained by inserting Eq. (25) in (27), followed by application of the expressions (22) and (23) for the functions $I_p$ and $II_p$. For the z-component we obtain:

$$[A^H\beta_z(r)]_i = F_0^2 I_z(kR_i^{xy}, k(z_i-z)) - jF_0^2 II_z(kR_i^{xy}, k(z_i+z-2z^+)) \quad (28)$$

and for the x- and y-components:

$$\frac{[A^H\beta_x(r)]_i}{jk(x_i-x)} = \frac{[A^H\beta_y(r)]_i}{jk(y_i-y)} \quad (29)$$

$$= F_0^2 I_{xy}(kR_i^{xy}, k(z_i-z)) + jF_0^2 II_{xy}(kR_i^{xy}, k(z_i+z-2z^+))$$

The new functions $I_z$, $II_z$, $I_{xy}$ and $II_{xy}$ are listed in table 1 below together with $I_p$ and $II_p$. Table 1 also includes the form these functions have in an embodiment with a constant weighting ($F(k_z)=1$) of the elementary wave functions.

TABLE 1

2-dimensional functions used in an embodiment of the calculation of correlation functions for different weighting schemes.

| | $F(k_z)$ | |
|---|---|---|
| | 1 | $\sqrt{k/|k_2|}$ |
| $I_p(\rho,\zeta)$ | $\int_0^{\pi/2} J_0(\rho\sin(\theta))e^{j\zeta\cos(\theta)}\sin(\theta)\cos(\theta)d\theta$ | $\int_0^{\pi/2} J_0(\rho\sin(\theta))e^{j\zeta\cos(\theta)}\sin(\theta)d\theta$ |
| $II_p(\rho,\zeta)$ | $\int_0^\infty J_0(\rho\sqrt{1+v^2})e^{-\zeta v}vdv$ | $\int_0^\infty J_0(\rho\sqrt{1+v^2})e^{-\zeta v}dv$ |
| $I_z(\rho,\zeta)$ | $\int_0^{\pi/2} J_0(\rho\sin(\theta))e^{j\zeta\cos(\theta)}\sin(\theta)\cos^2(\theta)d\theta$ | $\int_0^{\pi/2} J_0(\rho\sin(\theta))e^{j\zeta\cos(\theta)}\sin(\theta)\cos(\theta)d\theta$ |
| $II_z(\rho,\zeta)$ | $\int_0^\infty J_0(\rho\sqrt{1+v^2})e^{-\zeta v}v^2 dv$ | $\int_0^\infty J_0(\rho\sqrt{1+v^2})e^{-\zeta v}vdv$ |
| $I_{xy}(\rho,\zeta)$ | $\int_0^{\pi/2}\frac{J_1(\rho\sin(\theta))}{\rho\sin(\theta)}e^{j\zeta\cos(\theta)}\sin^3(\theta)\cos(\theta)d\theta$ | $\int_0^{\pi/2}\frac{J_1(\rho\sin(\theta))}{\rho\sin(\theta)}e^{j\zeta\cos(\theta)}\sin^3(\theta)d\theta$ |
| $II_{xy}(\rho,\zeta)$ | $\int_0^\infty \frac{J_1(\rho\sqrt{1+v^2})}{\rho\sqrt{1+v^2}}e^{-\zeta v}(1+v^2)vdv$ | $\int_0^\infty \frac{J_1(\rho\sqrt{1+v^2})}{\rho\sqrt{1+v^2}}e^{-\zeta v}(1+v^2)dv$ |

In the above table, $J_0$ and $J_1$ are the Bessel functions of order zero and one, respectively. The inventor has been able to find analytic expressions only for the real parts of the integrals $I_p$ and $I_{xy}$, however the integrals in general may be calculated by numerical integration, e.g. using any suitable numerical integration method, for example a Gauss-type algorithm. Instead of the integration going to infinity in three of the above integrals, the upper integration limits may be truncated at a point where the exponential function has reached a sufficiently low level, or the upper limit may be chosen based on the frequency and the spacing in the measurement grid.

As mentioned above, the large number of integrations can be speeded up considerably by generating (e.g. by numerical integration) and storing 2D tables for discrete values of the variables $\rho$ and $\zeta$. To calculate the integrals for specific values of $\rho$ and $\zeta$, an interpolation of the tables then has to be performed. Alternatively or additionally, 2D approximation functions covering different domains may be constructed.

The integrals $I_p$, $I_{xy}$, and $I_z$ have no singularities, so they can be put directly in table form and interpolated. The Integrals $II_p$, $II_{xy}$, and $II_z$ have a singularity where both parameters equal zero, i.e. at the origin of the parameter set at $(\rho,\zeta)=(0,0)$. In order for interpolation schemes to work properly close to this origin, the singularity should be extracted in the tabulated functions.

Taking the case of directional weighting of the wave functions, then for very small values of $\rho$ and $\zeta$ we have:

$$II_p(\rho,\zeta) \approx \frac{1}{\sqrt{\rho^2+\zeta^2}} \text{ for } \rho^2+\zeta^2 \ll 1$$

$$II_z(\rho,\zeta) \approx \frac{\zeta}{(\rho^2+\zeta^2)^{3/2}} \text{ for } \rho^2+\zeta^2 \ll 1$$

$$II_{xy}(\rho,\zeta) \approx \frac{1}{(\rho^2+\zeta^2)^{3/2}} \text{ for } \rho^2+\zeta^2 \ll 1$$

These singularities may be removed during interpolation in the following way: For the case of $II_p$, the integral is worked out by numerical integration for the set of parameter combinations to be stored in the table, and the values are multiplied by $\sqrt{\rho^2+\zeta^2}$ before they are stored in the table. The interpolations are thus performed on the scaled integrals. After the interpolation, the result is then divided by $\sqrt{\rho^2+\zeta^2}$. The remaining integrals may be processed analogously. With unit weighting a similar removal of singularities is performed before tabulating them and during interpolation.

It is also interesting to note that a further increase of efficiency may be obtained when the measurement and calculation points are arranged in respective planes parallel with all virtual source planes. In such a setup, only a few values of the second parameter ζ can occur for each frequency, thus making the generation of 1D tables attractive, each table corresponding to a respective value of ζ. For example, with a single virtual source plane, a single parallel measurement plane and a single parallel calculation plane, different from the measurement plane, 2 sets of 1D tables may be set up. This may efficiently be done for each frequency during execution. Similarly, with one virtual source plane, two parallel measurement planes, and a separate parallel calculation plane, four sets of 1D tables may be set up for every frequency. For example, the 1D tables may with advantage be generated by interpolation of pre-calculated 2D tables.

In general, as described above, when the sound pressure has been measured at the measurement locations, the pressure at a target position r may be obtained as:

$$p(r)=p^T(A^H A+\epsilon I)^{-1}A^H \alpha(r)=(A^H \alpha(r))^T((A^H A)^T+\epsilon I)^{-1}p$$

where p is a vector of measured/known sound pressure data at given locations, and ε is a regularization parameter. The particle velocity in a direction χ may be obtained from a similar expression:

$$u_\chi(r) = \frac{1}{\rho_0 c} p^T (A^H A + \epsilon I)^{-1} A^H \beta_\chi(r)$$
$$= \frac{1}{\rho_0 c} (A^H \beta_\chi(r))^T \left( (A^H A)^T + \epsilon I \right)^{-1} p$$

The above formulation uses Tikhonov type of regularization, but other formulations employing similar regularization schemes, for example so-called Enhanced Tikhonov regularization, may be used as well.

Now referring to FIG. 2 and with continued reference to FIG. 1, an embodiment of the reconstruction process based on the above described methodology will be described:

In an initial initialisation step S1, the process defines a suitable coordinate system 113 and a virtual source plane 101.

Generally, during test setup, the measurement locations may be chosen to lie along the real source surface of the object under investigation. For example, assuming free-field conditions and a planar transducer array, the measurement plane may be chosen approximately parallel to a section of the real source surface. Similarly, in non-free-field cases where a 3D array is used, the array is assumed to be fairly flat, and a median plane of the array may be positioned close to parallel with a section of the real source surface.

In step S1, the process may receive information about the position of the measurement points, i.e. the process receives coordinates of a set of positions $r_i$, i=1, 2, . . . , I, e.g. by a suitable position detection system as described above. The process may then choose a coordinate system relative to the measurement geometry. For example, for a planar transducer array, the process may define the xy-plane to lie in the measurement plane (i.e. the measurement plane to lie in the z=0 plane), with the origin in the centre of the planar array and the positive z-axis pointing away from the source surface i.e. into the source-free domain. Similarly, for a 3D array the z=0 plane may be defined to be the median plane of the array. It will be appreciated however, that the coordinate system may also be chosen in another way.

During the initialisation step S1, the process may further define the virtual source plane 101 relative to the chosen coordinate system, e.g. parallel to the xy-plane. The position of the virtual source plane may be performed automatically or at least partly based on a user input.

In some applications the real source geometry may not be known to the process or at least not known exactly. In such situations the process may e.g. reconstruct the sound field on a plane parallel with the array at a predetermined distance from the array. In this case, the distance between the array and the parallel virtual source plane may be specified as an input parameter to the process, e.g. as a user-defined input parameter.

In other situations, the real source geometry may be known and can be imported and aligned, or it can be measured with the position measurement system used also to measure array positions. If the array position and the object geometry are both known, then the processing software can automatically determine the distance between the two. And based on that the process can position the virtual source plane automatically, e.g. at a specified distance inside the real source surface and parallel with the array, assuming the array to be planar. If the array is not planar a median plane may be defined Generally, the virtual source plane may be defined a short distance inside the object, where the chosen distance may depend on the measurement geometry, e.g. from a typical or average distance between neighbouring measurement points. For example, the virtual source plane may be chosen to be more than (e.g. between about 1 and about 3 times) the average nearest neighbour distance between measurement points away from the source surface, inside the source object, i.e. on the side of the real source surface opposite to the location of the measurement points and the target location(s) at which the sound field is to be reconstructed. It has been found that optimal accuracy may be obtained by positioning the virtual source plane approximately one and a half measurement grid spacing behind the real source surface, i.e. further away from the measurement grid than the physical source surface. Slightly larger distances have often been found to provide better results at low frequencies.

For the purpose of the reconstruction process, one side of the virtual source plane is treated as being source free and homogeneous, so sound fields can be represented by the set of plane propagating and evanescent waves associated with that virtual source plane.

The initialisation of step S1 may further comprise the setting of one or more parameters, such as the weighting scheme to apply, the regularisation scheme to apply, the type and properties of the measurement system used, e.g. the number of transducers, the coordinates of the target positions at which the sound field is to be reconstructed, the acoustic property or properties to be calculated, the frequency range, the initialization of parts of the function tables to be interpolated—other parts may be supplied with the software executing the process. For example, these and additional or alternative parameters may be user defined via a suitable user-interface of the analysing unit 103.

In step S2, the process receives respective complex time-harmonic sound pressures $p(r_i)$ measured at the set of positions $r_i$. The $r_i$ represent coordinate vectors of the positions relative to the above coordinate system, e.g. the transducer positions as determined from the input received from position detection device 110. For the purpose of the present description, it will be assumed that the positions $r_i$ are located in a source free region Ω occupied by a homogeneous fluid, such as air or water.

In the free-field situation discussed above all sources are on one side of the plane z=0, the sound field can in principle be completely reconstructed based on measurements in for example that plane, but the method described herein may also be applied in connection with other, arbitrary 3D measurement grids. Furthermore, as will be described below, the process may also be applied to situations with multiple source planes.

The complex time-harmonic sound pressures $p(r_i)$ may be determined from the received transducer signals in a variety of ways. For example, a single simultaneous recording may be made with all transducers, followed by an FFT of all signals which provides a complex (time harmonic) sound field for every FFT line. Alternatively, measurements may be performed of cross spectra from a reference signal to all array transducers and of the auto-spectrum of the reference signal. The cross spectra divided by the square-root of the autospectrum then provides a complex (time harmonic) sound field for every frequency line of the applied spectra. The process of FIG. 2 performs a reconstruction of the sound field in $\Omega$ based on the measured sound pressures. Alternative embodiments may measure one or more alternative or additional acoustic quantities such as the sound pressure gradient, a particle velocity, etc. or a combination thereof.

In step S3, the process calculates an auto-correlation matrix $A^H A$ using eqn. (24), i.e. as a linear combination of the two-dimensional functions $I_p$ and $II_p$ evaluated at $(\rho,\zeta)=(kR_{ij}^{xy}, k(z_i-z_j))$ and $(\rho,\zeta)=(kR_{ij}^{xy}, k(z_i+z_j-2z^+))$, respectively. To this end the process uses the respective values for $\rho$ and $\zeta$ as index into look-up tables 112 of pre-calculated function values of $I_p$ and $II_p$, respectively. The look-up tables may be stored in a memory or other suitable storage medium of the analysing unit. The process may thus obtain the stored function values closest to $\rho$ and $\zeta$ perform a two-dimensional linear interpolation in $\rho$ and $\zeta$, or another suitable interpolation scheme—e.g. cubic interpolation.

It will be appreciated that, alternatively the process may calculate the transposed matrix $BB^H$ or another suitable transformed matrix, instead.

In step S4, the process computes the vector q as $$q=((A^H A)^T+\epsilon I)^{-1}p$$

or its transposed $$q^T=p^T(A^H A+\epsilon I)^{-1}.$$

Here, $\epsilon$ is a regularization parameter as described above. The regularization parameter can be calculated from a specified Signal-to-Noise-Ratio (SNR) or it can be calculated automatically based on noisy measured data using Generalized Cross Validation (GCV), the L-curve method or similar parameter estimation procedures. When a SNR is specified, then the parameter $\epsilon$ may be obtained as the average or the maximum of the diagonal elements in the matrix $BB^H$ multiplied by $10^{\wedge}(SNR/10)$. In the free-field case, when only a single virtual source plane is used, all diagonal elements are equal, so the value of a single diagonal element can be used instead of the average or maximum value.

The above matrix operation may be performed by any suitable numerical technique for solving matrix equations such as inverting matrices.

From the calculated values of q, the process may then calculate the sound pressure. It will be appreciated that, alternatively or additionally to the sound pressure, the process may calculate a different acoustic quantity, e.g. the particle velocity as described above. The sound intensity can be obtained from calculated values of pressure and particle velocity.

Accordingly, the process may calculate the sound pressure and/or the particle velocity at each of a set of target points r, where the sound field is to be reconstructed. Two examples of a target point are designated 109 in FIG. 1. In many situations, it will be of interest to reconstruct the sound field on the source surface of the object under investigation. For example, the process may calculate the sound pressure at each of a set of grid points of a regular grid. For the purpose of the present description a point for which a reconstructed sound field value is to be calculated will also be referred to as calculation point.

The process may loop through all calculation points and calculate the desired acoustical quantity. In particular, in step S5, the process calculates the desired acoustic quantity at a current calculation position r.

For example, the process may compute the vector(s)

$$\phi(r)=A^H \alpha(r)$$

and/or $$\psi_\chi(r)=A^H \beta_\chi(r)$$

and calculates the pressure as $$p(r)=q^T \phi(r)$$

and/or the velocity as $$u_\chi(r)=q^T \psi_\chi(r).$$

The process calculates the correlation vectors $A^H \alpha(r)$ and $A^H \beta_\chi(r)$ using eqns. (25) and (28), respectively, in a similar fashion as described in connection with the calculation of $A^H A$ in step S3 above, i.e. as linear combinations of two-dimensional functions $I_p$, $II_p$ and $I_z$, $II_z$, or $I_{xy}$, $II_{xy}$, respectively, evaluated at respective values of the input parameters $\rho$ and $\chi$. As above, the values of the input parameters at which the functions are to be evaluated are used as an index into respective look-up tables 112 to obtain pre-calculated function values of the 2D functions and by performing a qubic or other type of interpolation between the tabulated values $I_p$, $II_p$ and $I_z$, $II_z$ or $I_{xy}$, $II_{xy}$, respectively.

In step S6, the process determines whether there are unprocessed calculation points left. If this is the case, the process returns to step S5, otherwise the process proceeds at step S7, where the set of calculated sound pressures and/or particle velocities are output, e.g. as a graphical representation, as an array of numerical values, and/or in any other suitable format. Alternatively, or additionally, the sound intensity is easily obtained from sound pressure and particle velocity.

In the above, an embodiment has been described in connection with free field conditions in a situation as illustrated in FIG. 3a. However, embodiments of the method described herein may also be used in other situations, e.g. when sources and reflecting objects are not restricted to a half space. In the following, modifications to the above embodiment will be described that provide a plane wave formulation for non-free-field conditions, thus accounting for situations where the plane wave functions defined in Eq. (16) no longer constitute a complete basis for sound fields in the measurement region.

We consider first the case illustrated in FIG. 3b, where measurements are taken in a homogeneous and source-free medium between the two parallel planes 101a and 101b at positions $z^+$ and $z^-$, $z^+ \leq z \leq z^-$. The part of the sound field with sources for $z \leq z^+$ can be represented by the basis functions of Eq. (16). To represent also the sound field components with sources for $z \geq z^-$ we add a corresponding set of plane wave functions, resulting in the combined set:

$$\Phi_k^{z+}(r)=F_{z+}(k_z)e^{-j(k_x x+k_y y+k_z(z-z^+))} \text{ sources for } z<z^+ \quad (30)$$

$$\Phi_k^{z-}(r)=F_{z-}(k_z)e^{-j(k_x x+k_y y-k_z(z-z^-))} \text{ sources for } z>z^- \quad (31)$$

where the definition of $k_z$ in Eq. (17) is still used, and omni-directional weighting is applied for both sets:

$$F_{z+}(k_z) = F_{0,z+}\sqrt{\frac{k}{|k_z|}}, \quad F_{z-}(k_z) = F_{0,z-}\sqrt{\frac{k}{|k_z|}} \quad (32)$$

Hence, adding a virtual source plane corresponds to adding a set of plane wave functions in the SONAH (or HELS) method. Equations (13), (14), (20) and (21) show that a SONAH estimation procedure taking into account the combined set of basis functions, (30) and (31), can be obtained by adding the contributions from the two sets in the elements of the matrices $A^H A$ and $A^H \alpha(r)$. The result of doing this is:

$$[A^H A]_{ij} = F_{0,z+}^2 I_p(kR_{ij}^{xy}, k(z_i - z_j)) + F_{0,z+}^2 II_p(kR_{ij}^{xy}, k(z_i + z_j - 2z^+)) + \quad (33)$$
$$F_{0,z-}^2 I_p(kR_{ij}^{xy}, k(z_j - z_i)) + F_{0,z-}^2 II_p(kR_{ij}^{xy}, k(2z^- - z_i - z_j))$$

$$[A^H \alpha(r)]_i = F_{0,z+}^2 I_p(kR_i^{xy}, k(z_i - z)) + F_{0,z+}^2 II_p(kR_i^{xy}, k(z_i + z - 2z^+)) + \quad (34)$$
$$F_{0,z-}^2 I_p(kR_i^{xy}, k(z - z_i)) + F_{0,z-}^2 II_p(kR_i^{xy}, k(2z^- - z_i - z))$$

The vectors $A^H \beta_\chi(r)$ needed for estimation of particle velocity can be derived just like for the free-field case with the following result:

$$[A^H \beta_z(r)]_i = \quad (35)$$
$$F_{0,z+}^2 I_z(kR_i^{xy}, k(z_i - z)) - jF_{0,z+}^2 II_z(kR_i^{xy}, k(z_i + z - 2z^+)) -$$
$$F_{0,z-}^2 I_z(kR_i^{xy}, k(z - z_i)) + jF_{0,z-}^2 II_z(kR_i^{xy}, k(2z^- - z_i - z))$$

$$\frac{[A^H \beta_x(r)]_i}{jk(x_i - x)} = \frac{[A^H \beta_y(r)]_i}{jk(y_i - y)} = \quad (36)$$
$$F_{0,z+}^2 I_{xy}(kR_i^{xy}, k(z_i - z)) + F_{0,z+}^2 II_{xy}(kR_i^{xy}, k(z_i + z - 2z^+)) +$$
$$F_{0,z-}^2 I_{xy}(kR_i^{xy}, k(z - z_i)) + F_{0,z-}^2 II_{xy}(kR_i^{xy}, k(2z^- - z_i - z))$$

The above formulation puts no restriction on the selection of the measurement positions, but a planar array may not be sufficient to get accurate predictions. This can be illustrated by the fact that sources which are image symmetric in the measurement plane cannot then be distinguished because they produce equal pressure at each microphone. Typically, a dual layer array consisting of two identical parallel planar rectangular arrays may be used. The weight on the waves with sources on either side of the array can be adjusted through the constant coefficients $F_{0,z+}$ and $F_{0,z-}$. Typically, both parameters will be chosen equal to one, but if no significant sources are present on one side of the array, better estimates can be achieved by setting one of them equal to zero, providing thereby the information of the single-sided source distribution to the formulation.

The extension of the case with sources on both sides of an infinite planar section (e.g. a slab or slice) to the case with sources on all six sides of a box-shaped volume is illustrated by the sectional view in FIG. 3c. In this situation, we just add contributions to the matrix elements from the plane wave spectra belonging to each side of the box. The corresponding formulae are given in table 2 below.

TABLE 2

Formulae for the case of sources on all six sides $$[A^H A]_{ij} = F_{0,z+}^2 I_p(kR_{ij}^{xy}, k(z_i - z_j)) + F_{0,z+}^2 II_p(kR_{ij}^{xy}, k(z_i + z_j - 2z^+)) + \quad (III.1)$$
$$F_{0,z-}^2 I_p(kR_{ij}^{xy}, k(z_j - z_i)) + F_{0,z-}^2 II_p(kR_{ij}^{xy}, k(2z^- - z_i - z_j)) +$$
$$F_{0,x+}^2 I_p(kR_{ij}^{yz}, k(x_i - x_j)) + F_{0,x+}^2 II_p(kR_{ij}^{yz}, k(x_i + x_j - 2x^+)) +$$
$$F_{0,x-}^2 I_p(kR_{ij}^{yz}, k(x_j - x_i)) + F_{0,x-}^2 II_p(kR_{ij}^{yz}, k(2x^- - x_i - x_j)) +$$
$$F_{0,y+}^2 I_p(kR_{ij}^{xz}, k(y_i - y_j)) + F_{0,y+}^2 II_p(kR_{ij}^{xz}, k(y_i + y_j - 2y^+)) +$$
$$F_{0,y-}^2 I_p(kR_{ij}^{xz}, k(y_j - y_i)) + F_{0,y-}^2 II_p(kR_{ij}^{xz}, k(2y^- - y_i - y_j))$$

$$[A^H \alpha(r)]_i = F_{0,z+}^2 I_p(kR_i^{xy}, k(z_i - z)) + F_{0,z+}^2 II_p(kR_i^{xy}, k(z_i + z - 2z^+)) + \quad (III.2)$$
$$F_{0,z-}^2 I_p(kR_i^{xy}, k(z - z_i)) + F_{0,z-}^2 II_p(kR_i^{xy}, k(2z^- - z_i - z)) +$$
$$F_{0,x+}^2 I_p(kR_i^{yz}, k(x_i - x)) + F_{0,x+}^2 II_p(kR_i^{yz}, k(x_i + x - 2x^+)) +$$
$$F_{0,x-}^2 I_p(kR_i^{yz}, k(x - x_i)) + F_{0,x-}^2 II_p(kR_i^{yz}, k(2x^- - x_i - x)) +$$
$$F_{0,y+}^2 I_p(kR_i^{xz}, k(y_i - y)) + F_{0,y+}^2 II_p(kR_i^{xz}, k(y_i + y - 2y^+)) +$$
$$F_{0,y-}^2 I_p(kR_i^{xz}, k(y - y_i)) + F_{0,y-}^2 II_p(kR_i^{xz}, k(2y^- - y_i - y))$$

$$[A^H \beta(r)]_i = F_{0,z+}^2 I_z(kR_i^{xy}, k(z_i - z)) - jF_{0,z+}^2 II_z(kR_i^{xy}, k(z_i + z - 2z^+)) - \quad (III.3)$$
$$F_{0,z-}^2 I_z(kR_i^{xy}, k(z - z_i)) + jF_{0,z-}^2 II_z(kR_i^{xy}, k(2z^- - z_i - z)) + jk(z_i - z)$$
$$[F_{0,x+}^2 I_{xy}(kR_i^{yz}, k(x_i - x)) + F_{0,x+}^2 II_{xy}(kR_i^{yz}, k(x_i + x - 2x^+)) +$$
$$F_{0,x-}^2 I_{xy}(kR_i^{yz}, k(x - x_i)) + F_{0,x-}^2 II_{xy}(kR_i^{yz}, k(2x^- - x_i - x)) +$$
$$F_{0,y+}^2 I_{xy}(kR_i^{xz}, k(y_i - y)) + F_{0,y+}^2 II_{xy}(kR_i^{xz}, k(y_i + y - 2y^+)) +$$
$$F_{0,y-}^2 I_{xy}(kR_i^{xz}, k(y - y_i)) + F_{0,y-}^2 II_{xy}(kR_i^{xz}, k(2y^- - y_i - y))]$$

TABLE 2-continued

Formulae for the case of sources on all six sides $$[A^H \beta_x(r)]_i = F_{0,x+}^2 I_z(kR_i^{yz}, k(x_i - x)) - jF_{0,x+}^2 II_z(kR_i^{yz}, k(x_i + z - 2x^+)) - \qquad (III.4)$$
$$F_{0,x-}^2 I_z(kR_i^{yz}, k(x - x_i)) + jF_{0,x-}^2 II_z(kR_i^{yz}, k(2x^- - x_i - x)) + jk(x_i - x)$$
$$[F_{0,y+}^2 I_{xy}(kR_i^{xz}, k(y_i - y)) + F_{0,y+}^2 II_{xy}(kR_i^{xz}, k(y_i + y - 2y^+)) +$$
$$F_{0,y-}^2 I_{xy}(kR_i^{xz}, k(y - y_i)) + F_{0,y-}^2 II_{xy}(kR_i^{xz}, k(2y^- - y_i - y)) +$$
$$F_{0,z+}^2 I_{xy}(kR_i^{xy}, k(z_i - z)) + F_{0,z+}^2 II_{xy}(kR_i^{xy}, k(z_i + z - 2z^+)) +$$
$$F_{0,z-}^2 I_{xy}(kR_i^{xy}, k(z - z_i)) + F_{0,z-}^2 II_{xy}(kR_i^{xy}, k(2z^- - z_i - z))]$$

$$[A^H \beta_y(r)]_i = F_{0,y+}^2 I_z(kR_i^{xz}, k(y_i - y)) - jF_{0,y+}^2 II_z(kR_i^{xz}, k(y_i + y - 2y^+)) - \qquad (III.5)$$
$$F_{0,y-}^2 I_z(kR_i^{xz}, k(y - y_i)) + jF_{0,y-}^2 II_z(kR_i^{xz}, k(2y^- - y_i - y)) + jk(y_i - y)$$
$$[F_{0,z+}^2 I_{xy}(kR_i^{xy}, k(z_i - z)) + F_{0,z+}^2 II_{xy}(kR_i^{xy}, k(z_i + z - 2z^+)) +$$
$$F_{0,z-}^2 I_{xy}(kR_i^{xz}, k(z - z_i)) + F_{0,z-}^2 II_{xy}(kR_i^{xy}, k(2z^- - z_i - z)) +$$
$$F_{0,x+}^2 I_{xy}(kR_i^{yz}, k(x_i - x)) + F_{0,x+}^2 II_{xy}(kR_i^{yz}, k(x_i + x - 2x^+)) +$$
$$F_{0,x-}^2 I_{xy}(kR_i^{yz}, k(x - x_i)) + F_{0,x-}^2 II_{xy}(kR_i^{yz}, k(2x^- - x_i - x))]$$

It may be observed that the formulae for sources on only two sides take into account plane propagating waves from all directions, because each side includes all plane waves from a hemisphere with equal weights. But the two sides do not include all types of evanescent waves: Waves decaying in the x- and y-directions are missing.

The examples below present a simulated measurement that illustrates the accuracy improvement achievable by allowing for waves decaying in the xy-plane.

Figure 2:
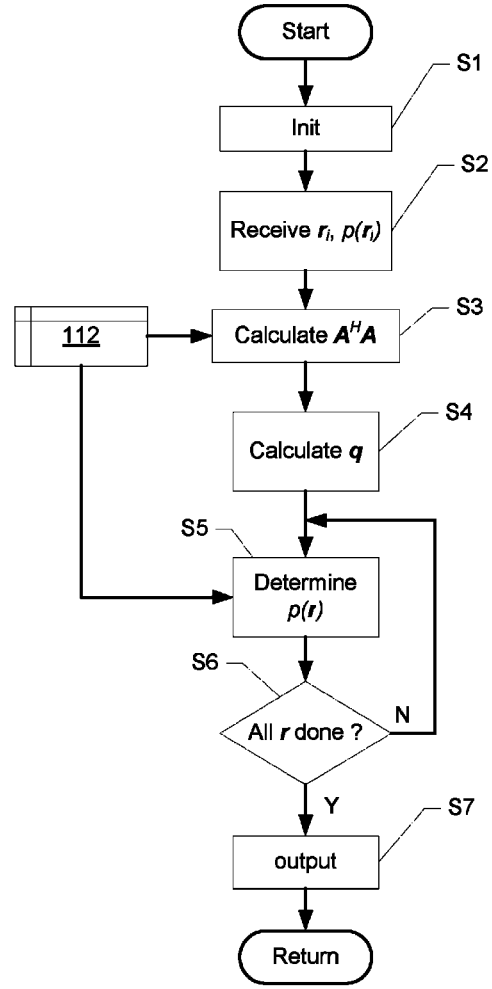
FIG. 2 shows a flow diagram of a process of computing a reconstructed sound field.

Hence, the method of FIG. 2 may be applied to cases with sources on multiple sides of the measurement location using the same 2D functions as shown in table 1. The correlation functions constituting the elements of the Auto- and Cross-correlation matrices can still be obtained as a linear combinations of function values of these 2D functions.

Inherent Estimation Errors

In the following an embodiment of a method will be described for determining at least an estimate of how well on average the values of the plane wave functions of the reconstruction method disclosed herein are predicted at the calculation point.

Considering first free field conditions, the set of plane propagating and evanescent wave functions is given by Eq. (16). The vector $\alpha(r)$ contains according to the definition in Eq. (7) the true values of all these elementary waves at the calculation point r. Eqs. (18), (12) and (2) show that one row of the matrix A contains the values of one of the wave functions across the measurement positions, and from Eq. (9) and (11) it therefore follows that the vector $\tilde{\alpha}(r)$ defined as:

$$\tilde{\alpha}(r) \equiv Ac(r) = A(A^H A + \epsilon I)^{-1} A^H \alpha(r) \qquad (37)$$

contains estimates of the wave functions at the calculation point. The 2-norm of this vector is a measure of the average amplitude of the predictions:

$$\|\tilde{\alpha}(r)\|_2^2 = \tilde{\alpha}^H \tilde{\alpha} = c^H(r)[A^H A]c(r) \qquad (38)$$

An average underestimation will be characterized by the prediction norm $\|\tilde{\alpha}(r)\|_2$ being smaller than the true norm $\|\alpha(r)\|_2$. To find the true norm $\|\alpha(r)\|_2$ we notice from Eq. (18), (12) and (2) that one column of the matrix A contains the true values of all wave functions at a microphone position, just like $\alpha(r)$ contains all function values at the calculation point. The value of $\alpha^H \alpha$ can therefore be calculated using the expressions (24) for a diagonal element $[A^H A]_{ii}$ of the matrix $A^H A$, just by replacing the microphone position $r_i$ by the calculation position r:

$$\|\alpha(r)\|_2^2 = \alpha^H \alpha \qquad (39)$$
$$= F_0^2 I_p(0, 0) + F_0^2 II_p(0, k(2z - 2z^+))$$
$$= F_0^2 \left[1 + \frac{1}{2k(z - z^+)}\right].$$

Here, the analytic expressions for the two integrals can be easily verified using the definitions (22) and (23). The inherent average amplitude gain is then defined as:

$$A(r) \equiv \frac{\|\tilde{\alpha}(r)\|_2}{\|\alpha(r)\|_2}. \qquad (40)$$

The 2-norm of the estimation error vector $\tilde{\alpha}(r) - \alpha(r)$ can be calculated by application of Eq (37) and (38):

$$\|\tilde{\alpha}(r) - \alpha(r)\|_2^2 = (\tilde{\alpha}(r) - \alpha(r))^H (\tilde{\alpha}(r) - \alpha(r)) \qquad (41)$$
$$= \|\tilde{\alpha}(r)\|_2^2 + \|\alpha(r)\|_2^2 - 2\text{Re}\{\alpha^H(r)\tilde{\alpha}(r)\}$$
$$= c^H(r)[A^H A]c(r) + \|\alpha(r)\|_2^2 -$$
$$2\text{Re}\{[A^H \alpha(r)]^H c(r)\},$$

and finally the inherent average estimation error level is defined as:

$$E(r) \equiv 10\log\left(\frac{\|\tilde{\alpha}(r) - \alpha(r)\|_2^2}{\|\alpha(r)\|_2^2}\right). \qquad (42)$$

The above description can be extended to non-free-field conditions simply by application of the extended formulae for the elements of the matrices $A^H A$ and $A^H \alpha(r)$, for example Eqs. (33) and (34) for the case of sources on two sides. In that case, the expression (39) for $\alpha^H \alpha$ has to be extended just like (24) was extended to (33):

$$\|\alpha(r)\|_2^2 = \alpha^H \alpha \quad (43)$$
$$= F_{0,z+}^2 I_p(0,0) + F_{0,z+}^2 II_p(0, k(2z-2z^+)) +$$
$$F_{0,z-}^2 I_p(0,0) + F_{0,z-}^2 II_p(0, k(2z^- - 2z))$$
$$= F_{0,z+}^2 \left[1 + \frac{1}{2k(z-z^+)}\right] + F_{0,z-}^2 \left[1 + \frac{1}{2k(z^- - z)}\right].$$

The relative prediction error that will be observed for a specific configuration of sources will differ from the above inherent error for two reasons:

1) The plane wave amplitude spectrum of the specific sound field will be different than the one for which the method is optimized. For free field conditions this optimal amplitude spectrum has the form $|F(k_z)|$ on the assumed virtual source plane $z=z^+$.

2) For the specific measured sound field, the prediction error is calculated on the overall sound pressure, not as an RMS over the plane wave components.

The effects of each one of these two differences will be illustrated below.

EXAMPLES

Numerical Investigation of Prediction Errors

In the following, information about the regions of validity of the predictions of the method described herein for a couple of typical array geometries and as a function of frequency will be summarized.

Measurement errors will not be considered, and methods for automatic determination of the regularization parameter (GCV, L-curve, . . . ) will not be investigated either. For the purpose of the present example, the regularization parameter $\epsilon$ to be used in Eq. (11) and (26) is determined from a specified dynamic range D (Signal-to-Noise-Ratio) using the following formula (see e.g. R. Steiner and J. Hald, "Near-field Acoustical Holography without the errors and limitations caused by the use of spatial DFT," Intern. J. Acoust. Vib. 6, 83-89 (2001)):

$$\epsilon = [A^H A]_{ii} 10^{-D/10}, \quad (44)$$

where $[A^H A]_{ii}$ is a diagonal element of the matrix $A^H A$. This relation was derived for a planar array and free-field conditions, in which case all diagonal elements are equal. Here we use in general the average value of the diagonal elements. Typical values of D lie in the range between 15 and 30 dB. In the following we use D=30 dB unless something else is specified.

Example A

Region of Accurate Pressure Representation in a Measurement Plane

We start with an investigation of the generic inherent error distributions in the array plane $z=0$ of two different irregular planar array designs. Both have a diameter equal to 0.75 m and both are optimized for beamforming application up to at least 20 kHz. One is a Spoke Wheel Array consisting of 13 identical 6-element line arrays arranged as spokes in a wheel, see FIG. 5. The other is a Sector Wheel Array (see e.g. J. Hald, "Array designs optimized for both low-frequency NAH and high-frequency beamforming", Proceedings of Inter-Noise 2004) consisting of 7 identical angular sectors with 12 microphones irregularly but uniformly distributed in each sector. The uniform distribution of the sector wheel array was maintained during the array geometry optimization in order to obtain good performance in connection with SONAH applications. Since the arrays are planar, we assume free field conditions and use only a single virtual source plane. An average element spacing is defined by calculating the average array area per element, and for both array geometries it is close to 7 cm. For a regular rectangular array, this spacing would support a frequency range up to around 2 kHz, and to avoid spatial aliasing up to that frequency, a standoff distance not smaller than the array grid spacing should be chosen. Since the virtual source plane should be positioned approximately one microphone spacing behind a real source surface at $z_0=-7$ cm, we choose a virtual source plane 14 cm from the array plane, i.e. $z^+=-14$ cm.

Figure 5:
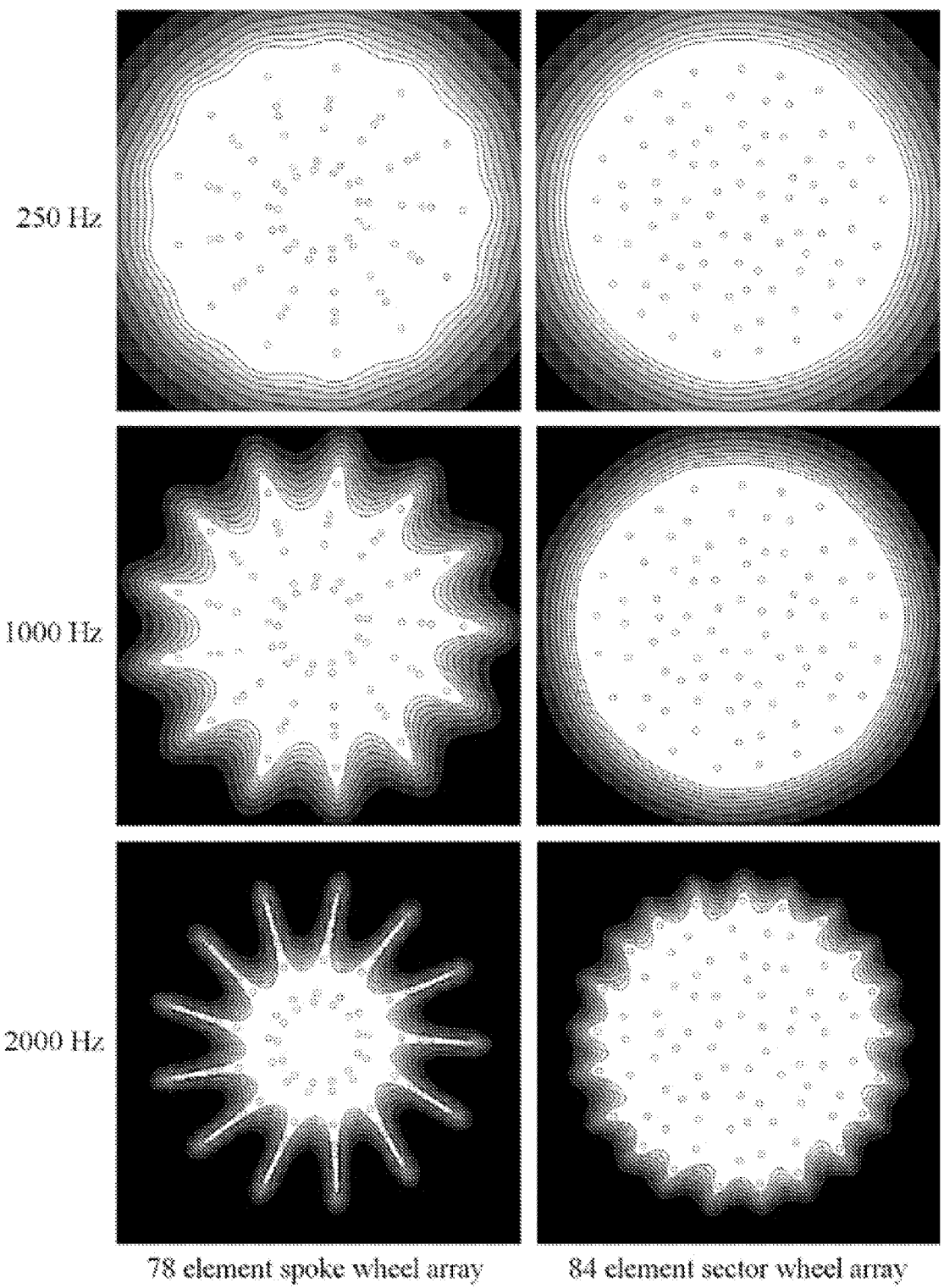
FIG. 5 shows an inherent relative error level $E(r)$ of sound pressure prediction in the array plane for two irregular planar arrays.

The contour plots in FIG. 5 show the inherent relative error level E(r) of the sound pressure prediction in the array plane with the microphone positions indicated by circles. Areas with white color represent inherent error levels E(r) below −20 dB, and the grey contours show the degradation of the accuracy in steps of 2 dB to error levels larger than −6 dB represented by the black color. At low frequencies, both arrays can provide a good sound pressure representation across the entire array area, but already at 1 kHz the gaps in the microphone distribution of the spoke wheel array become too big to provide good representation in the gaps. The sector wheel array provides acceptable pressure representation over the full array area all the way up to 2 kHz, which is clearly not the case for the spoke wheel array geometry. The spoke wheel array is very good for beamforming applications, though, and its support structure is easier to build in large sizes.

Example B

Region of Accurate Pressure Representation Outside the Measurement Plane

We now turn to an investigation of the region of accurate sound pressure prediction in a plane normal to the array plane. Instead of the irregular arrays designed for beamforming we consider regular 8×8 element single layer (8×8×1) and dual layer (8×8×2) arrays with 3 cm element spacing in the x- and y-directions, covering the area 0≤x≤21 cm, 0≤y≤21 cm. Both array types have a microphone layer in the xy-plane z=0, and the dual layer array has an additional identical layer at z=3 cm. We look at the relative sound pressure prediction error in the xz-plane y=10.5 cm, which is a symmetry plane of the arrays. Just like for the irregular planar arrays we choose for the single layer regular array a virtual source plane at a distance from the array equal to two times the array element spacing, i.e. $z^+=-6$ cm. For the dual layer array we choose the same distance to the front virtual source plane and a distance to the rear virtual source plane equal to 19 times the element spacing, i.e. $z^+=-6$ cm, $z^-=60$ cm.

Figure 6:
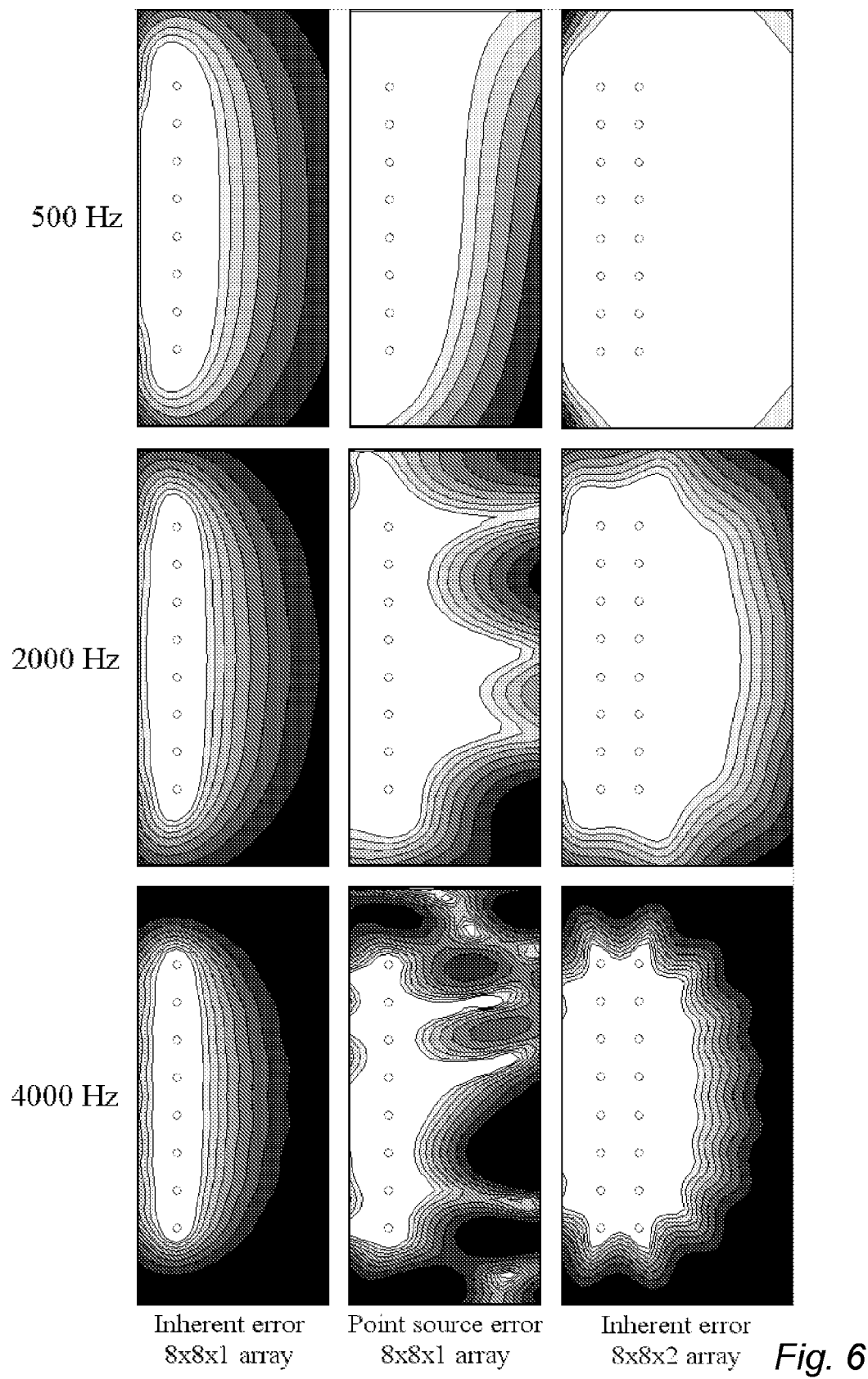
FIG. 6 shows Relative error levels in the xz symmetry plane of single and dual layer 8×8 element arrays. Left column: Inherent error level $E(r)$ of a single layer array. Middle column: Relative error of monopole pressure estimated by a single layer array. Right column: Inherent error level $E(r)$ of a dual layer array.

FIG. 6 shows in the left column the inherent error level E(r) of the single layer array (with a single virtual source plane) and in the right column the inherent error level E(r) of the dual layer array (with two virtual source planes). The middle column shows the relative error of the sound pressure prediction by the single layer array for a specific sound field: The field of a monopole point source at (x,y,z)=(7.5, 7.5, −6.0) cm. The mapping area extends 6 cm beyond the array area in both directions along the x-axis, and in the z-direction from z=−3 cm to a distance equal to 4 times the array element spacing in the positive z-direction. Clearly, the error distribution of the particular sound field prediction is more irregular and in general lower than the generic inherent error. Significantly smaller errors are achieved in certain areas than predicted by the inherent error level. This can be because error contributions from different plane wave components cancel each other. The inherent error level avoids such cancellation effects and provides a much more general picture of the estimation accuracy of the method. The dual layer array is seen to extend significantly the region of accurate representation as compared to the single layer array, although the degrees of freedom in the sound field have also been increased by adding an extra virtual source plane. The reason for the rather limited extent in the z-direction of the region with low prediction errors is that SONAH assumes nothing about the source distribution in the xy-directions. In order to provide good far-field estimates, some assumption about the size of the source area may be integrated in the method. This could for example be done by the use of a SONAH formulation based on a limited distribution of monopole sources instead of plane propagating and evanescent waves.

Example C

Sensitivity of Prediction Accuracy to Changing Parameters

To limit the amount of data in the investigation of sensitivity to parameter changes, we look at the prediction errors only along the center normal to the array. Only the single layer 8×8×1 array of example B will be considered. FIG. 7a shows the inherent error level for the same condition as that represented in the left column of FIG. 6, so what we see is just a set of horizontal slices through the middle of the contour plots in the left column of FIG. 6. A couple of frequencies are added in FIG. 7a, though, for example the higher limiting frequency 5 kHz of the 3 cm spaced regular array grid. Clearly, at 5 kHz the inherent error level has started a quick increase—even in the measurement plane, but an acceptable prediction can still be achieved. FIG. 7b shows the corresponding curves of amplitude gain A(r). Even at 5 kHz the amplitude is still accurately predicted within one array grid spacing from the array plane, but outside that interval an increasing under-estimation is observed.

Figure 7:
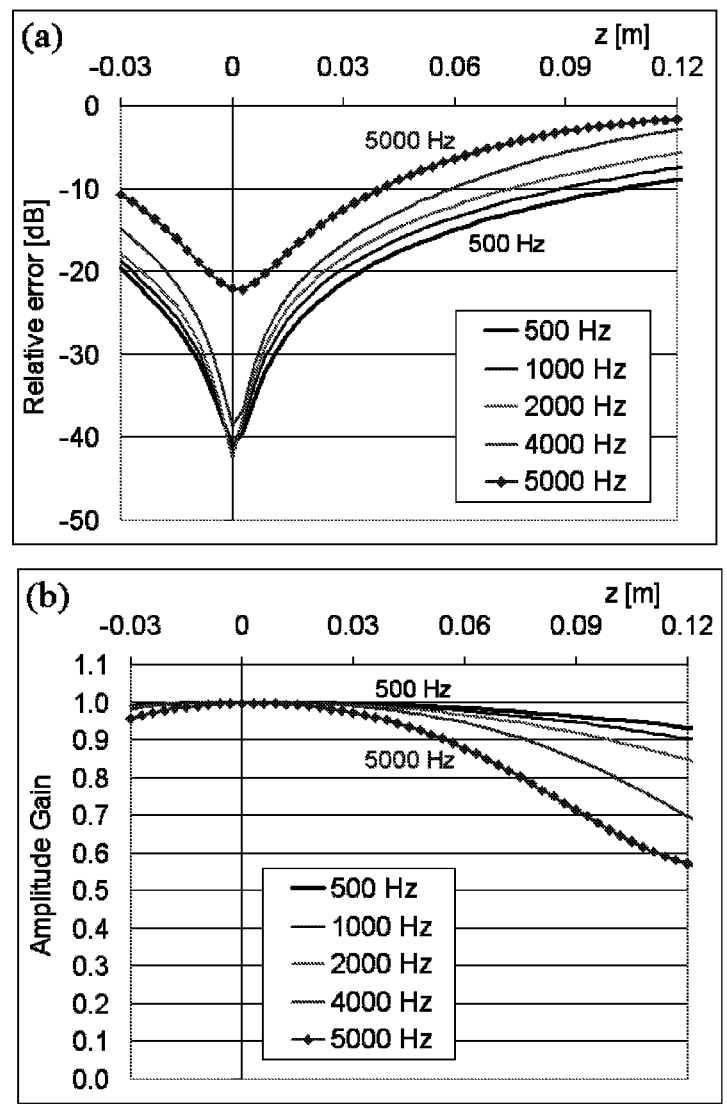
FIG. 7a shows (a) an inherent relative error level E and FIG. 7b shows an amplitude gain A on the symmetry axis normal to the array plane for an 8×8 element planar array.
Figure 8:
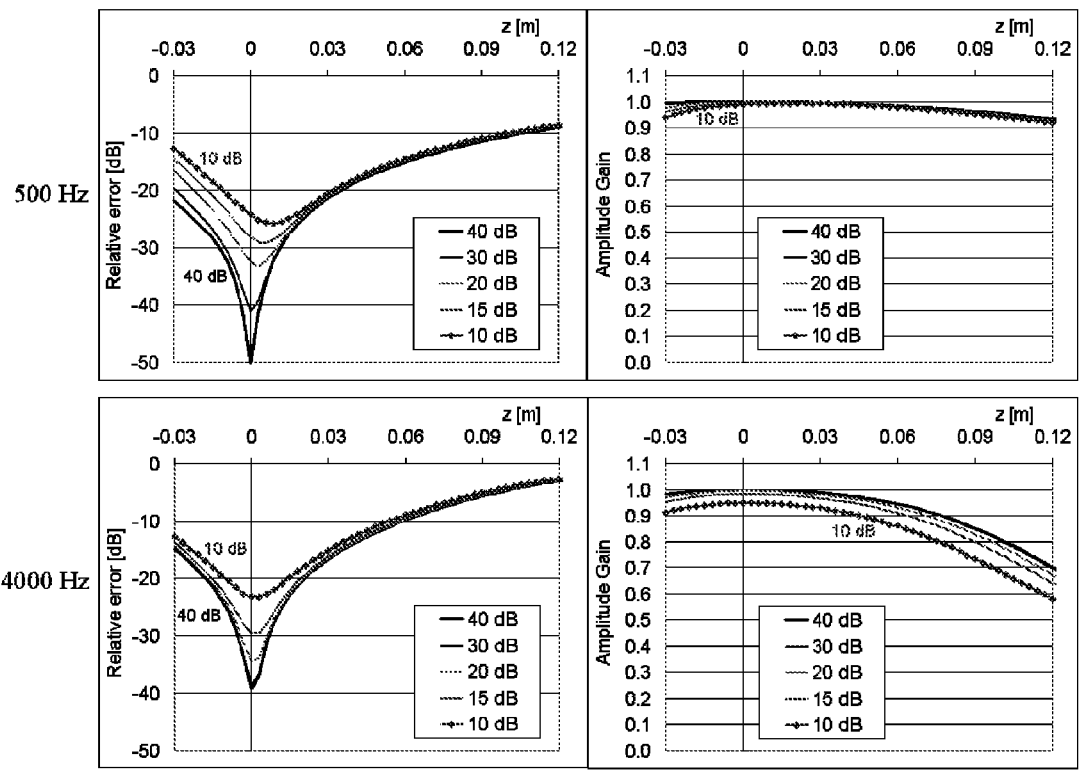
FIG. 8 shows an inherent relative error level $E(r)$ and amplitude gain $A(r)$ on the symmetry axis normal to the array plane for an 8×8 element planar array at a low and a high frequency. The curves represent different dynamic ranges, D, used in the reconstruction process.

In FIG. 7 the regularization parameter was determined from Eq. (44) with a fixed dynamic range D equal to 30 dB. The next step is to see, how the prediction error changes when the dynamic range D is changed. The left column in FIG. 8 presents the sensitivity of the inherent error level E to changes in D at a low frequency (500 Hz) and at a high frequency (4 kHz). For each frequency there is a set of curves labelled with the corresponding values of D, which range from 10 dB to 40 dB. In general, the prediction of pressure further away from the source region than the measurement plane is insensitive, while the prediction closer to the source region improves with increasing values of D (corresponding to smaller values of the regularization parameter)—in particular at the low frequency. This may be expected, since a smaller value of D will limit the reconstruction of the evanescent waves and since the evanescent waves constitute a bigger part of the sound field at low frequencies and close to the source region. The right column in FIG. 8 presents corresponding curves for the inherent amplitude gain A in the SONAH estimation. At 500 Hz the amplitude prediction is not very sensitive to changes in D, except very near the source region, while at 4 kHz an increasing under-estimation is observed at all positions (even further away from the source region) when the value of D becomes smaller than around 20 dB. The explanation must be that at high frequencies the propagating plane waves constitute a bigger part of the plane wave spectrum and thus of the singular value spectrum of the SONAH Auto-correlation matrix $A^H A$. When D is decreased (the regularization parameter is increased) beyond some point, then even parts of the propagating wave components will be significantly attenuated by the regularization.

Figure 9:
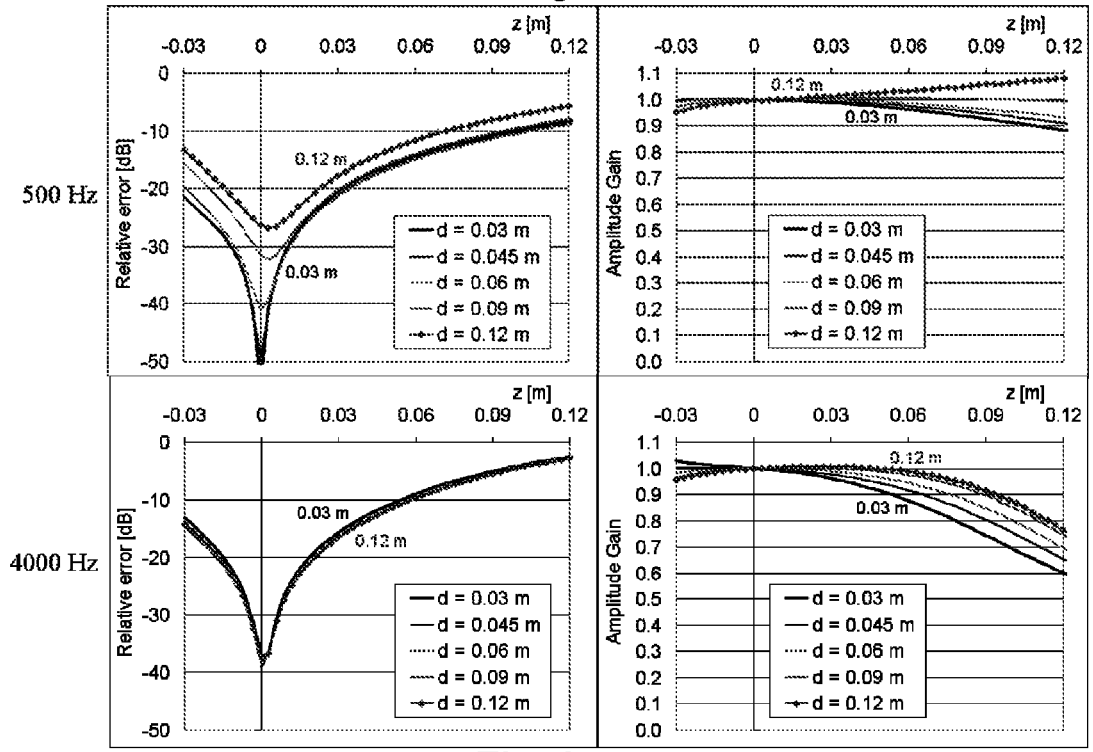
FIG. 9 shows an inherent relative error level $E(r)$ and amplitude gain $A(r)$ on the symmetry axis normal to the array plane for an 8×8 element planar array at a low and a high frequency. The curves represent different virtual source plane distances, $d=-z^+$, used in the reconstruction process, while the virtual source distance defining the actual content of evanescent waves is kept constant at 6 cm.

The inherent amplitude gain A and error level E as defined above represent the error at an estimation position, averaged over all plane propagating and evanescent waves, with the same weight applied to the evanescent wave components as that used in the derivation of the SONAH estimation algorithm. In both cases the wave functions are scaled in the same virtual source plane(s) ($z=z^+$ for free field conditions). The question to be investigated now is, how the error level changes, if the virtual source distances used in the SONAH calculations are not representative for the actual content of evanescent waves in a measurement application. Only free-field conditions and the use of a single virtual source plane shall be considered. To do this investigation, we notice that in Eq. (38) and (41) the correlation matrices $A^H A$ and $A^H \alpha$ represent the plane wave fields over which we average the estimation error, while the estimation weight vector c(r) represents the SONAH estimation. We can therefore investigate the sensitivity of the SONAH estimation to varying degree of mismatch between 1) the actual content of evanescent waves in a measurement and 2) their weight in the SONAH calculation by the use of different virtual source distances for 1) calculation of $A^H A$ and $A^H \alpha$ in (38) and (41), and 2) for calculation of the SONAH estimation weight vector c(r). For the results presented in FIG. 9 we have retained the previously used virtual source plane $z=z^+=-6$ cm for the actual sound field, i.e. in the calculation of $A^H A$ and $A^H \alpha$ used in Eq. (38) and (41), while a varying virtual source plane distance d has been used for the SONAH processing. A large value of d will put a low weight on the evanescent waves in the SONAH estimation. The left column in FIG. 9 presents the sensitivity of the inherent error level E to changes in d at a low frequency (500 Hz) and at a high frequency (4 kHz). For each frequency there is a set of curves labelled with the corresponding values of d, which range from 3 cm to 12 cm. The right column contains corresponding curves for the amplitude gain. In all cases the regularization parameter is specified through a fixed dynamic range D equal to 30 dB.

At 500 Hz the error level is rather insensitive to a too small virtual source distance, i.e. a too high weight on the evanescent waves in the reconstruction, but a too large distance eventually results in a slight over-estimation (A>1) of the level further away from the source region than the measurement plane. The explanation is wave-number leakage causing small evanescent wave components to be processed as propagating components and thereby contribute to the field further away: Because of the rather small number of measurement points, the distinction between propagating and evanescent wave components is not very sharp. When the SONAH processing (represented by the weight vector c(r)) puts very low weight on the evanescent waves, then the leakage of evanescent wave components to propagating components increases. Looking at the error increase for z<0, occurring also when d is large, the explanation is different: Because too low weight is put on the evanescent waves in the SONAH calculation matrices, the chosen regularization parameter will prevent some of these wave components from being sufficiently reconstructed.

At 4 kHz the evanescent waves constitute in general a much smaller part of the sound field, so the sensitivity to putting more or less weight on them in the SONAH calculation is smaller. The biggest effect is on the amplitude gain when a too small virtual source distance is used, putting a higher weight on the evanescent waves in the reconstruction than suggested by the actual plane wave spectrum. Close to the source region an over-estimation is observed, while further away a heavier under-estimation than normally is seen. The explanation is the same as that given for the overestimation at 500 Hz, the leakage now just goes the opposite way: Some small propagating wave components will be processed as evanescent waves, and thus they will be attenuated away from the source area and amplified towards the source area.

Example D

Sources in the Array Plane—Use of 6 Virtual Source Planes

Figure 10:
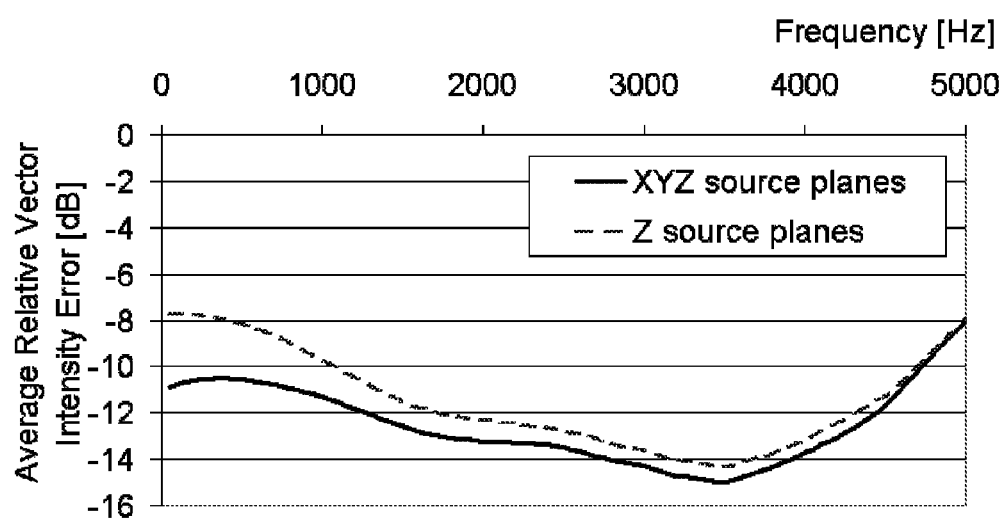
FIG. 10 illustrates the accuracy improvement gained by adding plane wave functions from all six sides instead of from just two sides in an embodiment of the calculation of 3D vector intensity from a single monopole point source in the centre plane of a dual layer 8×8 array. The point source is 6 cm outside of the array area.

FIG. 10 shows an example of the accuracy improvement gained by adding plane wave functions from all six sides instead of from just two sides, allowing a correct modelling of evanescent wave components that decay along directions in the xy-plane. A simulated measurement is performed with the same 8×8×2 dual layer array geometry as the one described in connection with example B. A single monopole point source is placed at (x,y,z)=(−6.0, 7.5, 1.5) cm, i.e. in the center plane between the two array layers and 6 cm outside the array area. Clearly, this monopole will create evanescent wave types that decay along directions in the xy-plane. SONAH is used to predict the intensity vectors at the measurement positions in the front array plane z=0 cm, based on the 128 measured pressure values. The relative average error level is then calculated using the formula:

$$L_{err} = 10 \cdot \log_{10}\left(\frac{\sum |I_i^{true} - I_i|}{\sum |I_i^{true}|}\right) \quad (45)$$

where $I_i^{true}$ is the true intensity vector at calculation point number i, $I_i$ is the SONAH estimate of the same vector, and the summations are over i. The SONAH calculation is performed using a 30 dB dynamic range, D=30 dB, and the virtual source planes are chosen to be 6 cm away from the array in all directions:
z$^-$=−9 cm, z$^+$=−6 cm, x$^-$=−27 cm, x$^+$=−6 cm, y$^-$=−27 cm, y$^+$=−6 cm.

Thus, the monopole is located on the boundary of the box defined by the 6 virtual source planes. Looking at FIG. 10, the low-frequency intensity estimation is seen to be significantly more accurate when all 6 virtual source planes are present than when only those parallel with the xy-plane are present. The improvement vanishes, however, with increasing frequency, because the evanescent waves constitute a smaller part of the sound field at higher frequencies.

Although some embodiments have been described and shown in detail, the invention is not restricted to them, but may also be embodied in other ways within the scope of the subject matter defined in the following claims. For example, the embodiments of the method disclosed herein have mainly been described in connection with an embodiment where the measured acoustic quantity is the sound pressure. However, it will be appreciated that in other embodiments a different acoustic quantity may be measured. For instance, instead of the sound pressure the particle velocity $u_\chi(r_i)$ in a direction $\chi$ may be measured at measurement position $r_i$. In such an embodiment, instead of equation (1), the following equation may be used for position $r_i$ when the system of linear equations to be solved for the expansion coefficient vector a is set up:

$$u_\chi(r) = \frac{-1}{j\omega\rho_0}\frac{\partial p(r)}{\partial \chi} = \frac{-1}{j\omega\rho_0}\sum_{n=1}^{N} a_n \frac{\partial \Psi_n(r)}{\partial \chi} = \sum_{n=1}^{N} a_n \Gamma_{\chi,n}(r)$$

where we have introduced the spatial derivatives of the expansion functions $$\Gamma_{\chi,n}(r) \equiv \frac{-1}{jk\rho_0 c}\frac{\partial \Psi_n(r)}{\partial \chi}$$

This means that in the matrices A and B the functions $\Psi_n(r_i)$ are replaced by $\Gamma_{\chi,n}(r_i)$ for n=1, 2, ..., N, and in the vector p of Eq. (3) the pressure $p(r_i)$ is replaced by the measured particle velocity $u_\chi(r_i)$. The involved elements of the autocorrelation matrix $A^HA$ then have to be changed accordingly.

The method and apparatus described herein may be used to reconstruct sound fields of a variety of sound/noise sources such as vibrating objects, e.g. when analysing acoustic properties of machines, motors, engines, vehicles such as cars, and/or the like.

Embodiments of the method described herein can be implemented by means of hardware comprising several distinct elements, and/or at least in part by means of a suitably programmed microprocessor.

In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A method of reconstructing a sound field, the sound field being generated by at least one sound source, the method comprising:
   receiving a set of measured values of at least a first acoustic quantity measured at respective ones of a set of measurement locations;
   computing each of a set of correlation functions, each correlation function being indicative of a correlation, in a spatial domain, of at least one set of plane waves at a first one of said measurement locations with the at least one set of plane waves at a second location
   computing a second acoustic quantity indicative of the reconstructed sound field at a target location from at least the computed correlation functions and the set of measured values; and
   wherein the method further comprises storing a representation of a set of interpolation functions for interpolating respective contributions to the correlation functions, the set of interpolation functions including one or more two-dimensional interpolation functions, each contribution being a function of two or less input parameters; and wherein the computing each of the set of correlation functions comprises computing each correlation function as a linear combination of values obtained from the stored representation.

2. A method according to claim 1, wherein the set of plane waves is a set of plane propagating and evanescent waves.

3. A method according to claim 2, wherein the set of plane waves is a continuous spectrum of plane propagating and evanescent waves.

4. A method according to claim 1, wherein the second location is chosen from the target location and the measurement locations.

5. A method according to claim 1, wherein the representation of each interpolation function comprises a look-up table, each look-up table including pre-calculated values of a respective contribution.

6. A method according to claim 5, wherein each look-up-table is indicative of a two-dimensional array of function values indexed by two input parameters, and wherein each function value is indicative of a value of the two-dimensional function at an input point defined by the two input values.

7. A method according to claim 1, wherein each plane wave of the at least one set of plane waves has a direction of propagation defined relative to a predetermined virtual source plane.

8. A method according to claim 7, wherein a region including the at least one sound source is defined by a source surface separating the at least one sound source from a source-free region, wherein the virtual source plane has a first side pointing towards the source free region, and wherein the directions of propagation of the plane waves point away from the virtual sound source and towards the source-free region.

9. A method according to claim 7, wherein the virtual source plane is defined to lie on a side of the source surface proximal to the at least one sound source.

10. A method according to claim 9, wherein the virtual source plane is defined to have a distance from the source surface larger than an average distance between nearest neighbor measurement locations of the set of measurement locations.

11. A method according to claim 7, wherein each of the respective contributions to the correlation functions is a two-dimensional integral function including an integral parameterized by two input parameters.

12. A method according to claim 11, wherein a first one of the two input parameters is indicative of a projected distance between the first measurement location and the second location, projected into the virtual source plane, the projected distance being scaled by a factor indicative of a wave number.

13. A method according to claim 11, wherein a second one of the two input parameters is a parameter indicative of a linear combination of respective distances from the virtual source plane to the first measurement location and to the second location, scaled by a factor indicative of a wave number.

14. A method according to claim 7, wherein each plane wave is weighted by a respective weighting factor according to a predetermined weighting scheme.

15. A method according to claim 14, wherein the predetermined weighting scheme is chosen from a uniform weighting and a directional weighting, the directional weighting of a plane wave being a function of a direction of propagation of the plane wave.

16. A method according to claim 7, wherein the set of measurement locations is arranged in one or more parallel measurement planes, the measurement planes being parallel with the one or two virtual source planes.

17. A method according to claim 16, wherein each of the respective contributions to the correlation functions is a two-dimensional function parameterized by a first and a second input parameter; wherein a measurement plane is parallel with a virtual source plane; wherein the target locations are arranged in a reconstruction plane parallel with the measurement plane; and wherein the storing a representation of a set of interpolation functions comprises generating look-up tables for respective values of the second input parameter, each look-up table being indicative of a one-dimensional array of function values of the two-dimensional function indexed by the first input parameter, the array comprising function values of the two-dimensional function at the corresponding value of the second input parameter and at respective values of the first input parameter.

18. A method according to claim 17, wherein the first input parameter is indicative of the distance between the projections of two positions for which a correlation function is calculated, the projections being projections on the virtual source plane, and the distance being multiplied by a wavenumber.

19. A method according to claim 7, wherein the second acoustic quantity is a particle velocity having a component in a direction parallel to the virtual source plane.

20. A method according to claim 7, comprising defining more than one virtual source planes, each corresponding to a respective set of plane waves; and wherein each of the correlation functions is indicative of a correlation of the sets of plane waves at a first one of said measurement locations with the sets of plane waves at a second location.

21. A method according to claim 1, wherein the representation of a set of interpolation functions comprises representations of six interpolation functions for interpolating respective six two-dimensional functions in respect of each weighting scheme.

22. A method according to claim 1, comprising computing, using the set of correlation functions, a quantity indicative of an estimated error of the calculated first acoustic quantity.

23. A method according to claim 1, wherein the measurement locations are arranged in an irregular planar array.

24. A method according to claim 1, wherein the first acoustic quantity is chosen from a sound pressure, a sound pressure gradient, and a particle velocity.

25. A method according to claim 1, wherein the second acoustic quantity is chosen from a sound pressure, a particle velocity, and a sound intensity.

26. A method according to claim 1, wherein the representation of at least one interpolation function comprises a look-up table including pre-calculated function values of the respective contribution; wherein the contribution is a function including a singularity for at least one pair of input values; and wherein the computing a correlation function as a linear combination of values obtained from the stored representation comprises obtaining a number of the stored function values multiplied by respective scaling factors to compensate for the singularity, the scaling factors depending on the respective input values to the contribution, performing an interpolation between the scaled function values to obtain a scaled interpolation value, and dividing the interpolation value by a corresponding scaling factor.

27. A processing apparatus for reconstructing a sound field, the processing device comprising an interface for receiving a set of measured values of at least a first acoustic quantity measured at respective ones of a set of measurement locations; and a processing unit configured to compute each of a set of correlation functions, each correlation function being indicative of a correlation, in a spatial domain, of at least one set of plane waves at a first one of said measurement locations with the at least one set of plane waves at a second location; and to compute a second acoustic quantity indicative of the reconstructed sound field at a target location from at least the computed correlation functions and the set of measured values;

wherein the processing unit comprises a storage medium for storing a representation of a set of interpolation functions for interpolating respective contributions to the correlation functions, the set of interpolation functions including one or more two-dimensional interpolation functions, each contribution being a function of two or less input parameters; and wherein the processing unit is adapted to compute each of the set of correlation functions as a linear combination of values obtained from the stored representation.

28. The processing apparatus of claim 27 in combination with a set of transducers for measuring a first acoustic quantity at a set of measurement locations, the set of transducers being connectable in communication connection to the processing apparatus so as to forward the measured first acoustic quantity to the processing apparatus.

29. The processing apparatus of claim 27 used for reconstructing sound fields generated by noise sources of a vehicle.

30. Computer program comprising program code means adapted to cause a data processing system to perform the steps of the method according to claim 1, when the program code means are executed on the data processing system.

* * * * *